United States Patent [19]

Levine et al.

[11] Patent Number: 5,060,135
[45] Date of Patent: Oct. 22, 1991

[54] APPARATUS FOR MANIPULATING DOCUMENTS IN A DATA PROCESSING SYSTEM UTILIZING REDUCED IMAGES OF SHEETS OF INFORMATION WHICH ARE MOVABLE

[75] Inventors: Stephen R. Levine, North Andover, Mass.; Alex J. Harui, Derry, N.H.; Michael W. Schirpke, Bedford, Mass.; Karen Donoghue, Melrose, Mass.; Donna Ajgaonkar, Carlisle, Mass.

[73] Assignee: Wang Laboratories, Inc., Lowell, Mass.

[21] Appl. No.: 265,685

[22] Filed: Nov. 1, 1988

Related U.S. Application Data

[63] Continuation-in-part of Ser. No. 245,419, Sep. 16, 1988, which is a continuation-in-part of Ser. No. 200,091, May 27, 1988, abandoned.

[51] Int. Cl.$^5$ .................... G06F 15/40; G06F 3/033
[52] U.S. Cl. .................... 364/200; 364/237.1; 364/237.2; 364/225.6; 364/236.8
[58] Field of Search .................... 340/707; 364/200 MS File, 900 MS File

[56] References Cited

U.S. PATENT DOCUMENTS

| | | | |
|---|---|---|---|
| 3,703,936 | 12/1972 | Dertouzos . | |
| 4,177,354 | 12/1979 | Mathews | 340/707 |
| 4,387,395 | 6/1983 | Shaphorst | 358/140 |
| 4,424,575 | 1/1984 | Clarke et al. | 364/900 |
| 4,430,526 | 2/1984 | Brown | 340/707 |
| 4,475,239 | 10/1984 | Raamsdonk | 382/57 |
| 4,488,000 | 12/1984 | Glenn . | |
| 4,514,818 | 4/1985 | Walker | 364/521 |
| 4,516,156 | 5/1985 | Fabris et al. | 397/53 |
| 4,552,991 | 11/1985 | Hulls | 178/19 |
| 4,562,304 | 12/1985 | Ward et al. | 178/18 |
| 4,570,033 | 2/1986 | Hulls | 178/19 |
| 4,575,580 | 3/1986 | Jandrell | 178/18 |
| 4,577,057 | 3/1986 | Blesser | 178/18 |
| 4,580,007 | 4/1986 | Searby | 178/18 |
| 4,582,955 | 4/1986 | Blesser | 178/19 |
| 4,633,416 | 12/1986 | Walker | 364/521 |
| 4,633,436 | 12/1986 | Flurry | 364/900 |
| 4,638,119 | 1/1987 | Blesser et al. | 178/19 |
| 4,644,102 | 2/1987 | Blesser et al. | 178/19 |
| 4,649,380 | 3/1987 | Penna . | |
| 4,675,665 | 6/1987 | Halliwell | 340/707 |
| 4,677,428 | 6/1987 | Bartholow | 340/708 |
| 4,688,031 | 8/1987 | Haggerty . | |
| 4,714,918 | 12/1987 | Barker et al. | 340/724 |
| 4,723,836 | 2/1988 | Kono et al. | 340/707 |
| 4,734,619 | 3/1988 | Havel . | |
| 4,742,473 | 5/1988 | Shugar | 340/707 |
| 4,755,809 | 7/1988 | Ikegami et al. | 340/724 |
| 4,785,564 | 11/1988 | Gurtler | 340/707 |

FOREIGN PATENT DOCUMENTS

| | | | |
|---|---|---|---|
| 159400 | 10/1985 | European Pat. Off. | 340/709 |
| 60-218128 | 8/1985 | Japan . | |
| 218128 | 10/1985 | Japan . | |

OTHER PUBLICATIONS

*Macintosh*, published 1983 by Apple Computer, Inc., Cupertino, Calif., pp. 13-109 & 147-154.

(List continued on next page.)

*Primary Examiner*—Lawrence E. Anderson
*Attorney, Agent, or Firm*—Michael H. Shanahan

[57] ABSTRACT

A data processing system provides a desk view which serves as a graphical user interface to the system. The desk view displays detailed miniaturized images of all documents possessed by the user. The compressed document images are user stackable and are automatically stacked when the images overlap by a predefined amount. The predefined amount is user settable. The desk view also displays icons of operations for mailing, stapling, copying and printing of documents. User activation of these operations occurs upon the removal of a stylus end from a surface after the electronic stylus has positioned a document image and icon relative to each other. Some operations include a screen view enabling user establishment of parametes of the operation after activation. Some icons are displayed with automatic uncovering when a stamp is positioned over it.

33 Claims, 9 Drawing Sheets

U.S. PATENT DOCUMENTS

*The Complete Book of MacIntosh Assembly Language Programming*, by Weston, published 1987, pp. 27–147, vol. II.

*Macworld*, "A Pair of Digitizing Tablets", published Mar. 1987 by PCW Communications, Inc., San Francisco, Calif., pp. 143–144.

"Macintosh MacPaint", copywright 1983, by Apple Computer, Inc., Cupertino, Calif., pp. 1–32.

"Method for Creating Annotation Data", IBM Technical Disclosure Bulletin, vol. 28, No. 4, Sep. 1985, pp. 1623–1628.

"The Complete Book of Macintosh Assembly Language Programming", Weston, D., published 1987 by Scott, Foresman and Co., Ill., pp. 27–147.

"The Smalltalk Environment", by Tesler, L., BYTE Magazine, Aug. 1981, pp. 90–144.

"The Lisa Computer System: Apple Designs a New Kind of Machine", by Williams, G., BYTE Magazine, Feb. 1983, pp. 33–50.

"The Apple Macintosh Computer: Mouse-Window-Desktop Technology Arrives for Under $2500", by Williams, G., BYTE Magazine, Feb. 1984, pp. 30–54.

"Method of Multiple Selection of Icons On a Computer Display by Using a Pointing Device", IBM Technical Disclosure Bulletin, vol. 31, No. 1, Jun. 1988, pp. 19–20.

"System for Integrating and Collating Audio and Text, and for Text Creation and Editing", by P. D. Welch, IBM Technical Disclosure Bulletin, vol. 16, No. 2, Jul. 1973, pp. 500–503.

"Put-That-There": Voice and Gesture at the Graphics Interface by Richard A. Bolt, in ACM 1982, pp. 262–270.

Goodman, Danny, *The Complete HyperCard Handbook* (Bantam Books 1987), pp. 32–34.

Microsoft Corporation, *Show Partner User's Guide* (1986), Chaps. 3, 4, pp. 27–48.

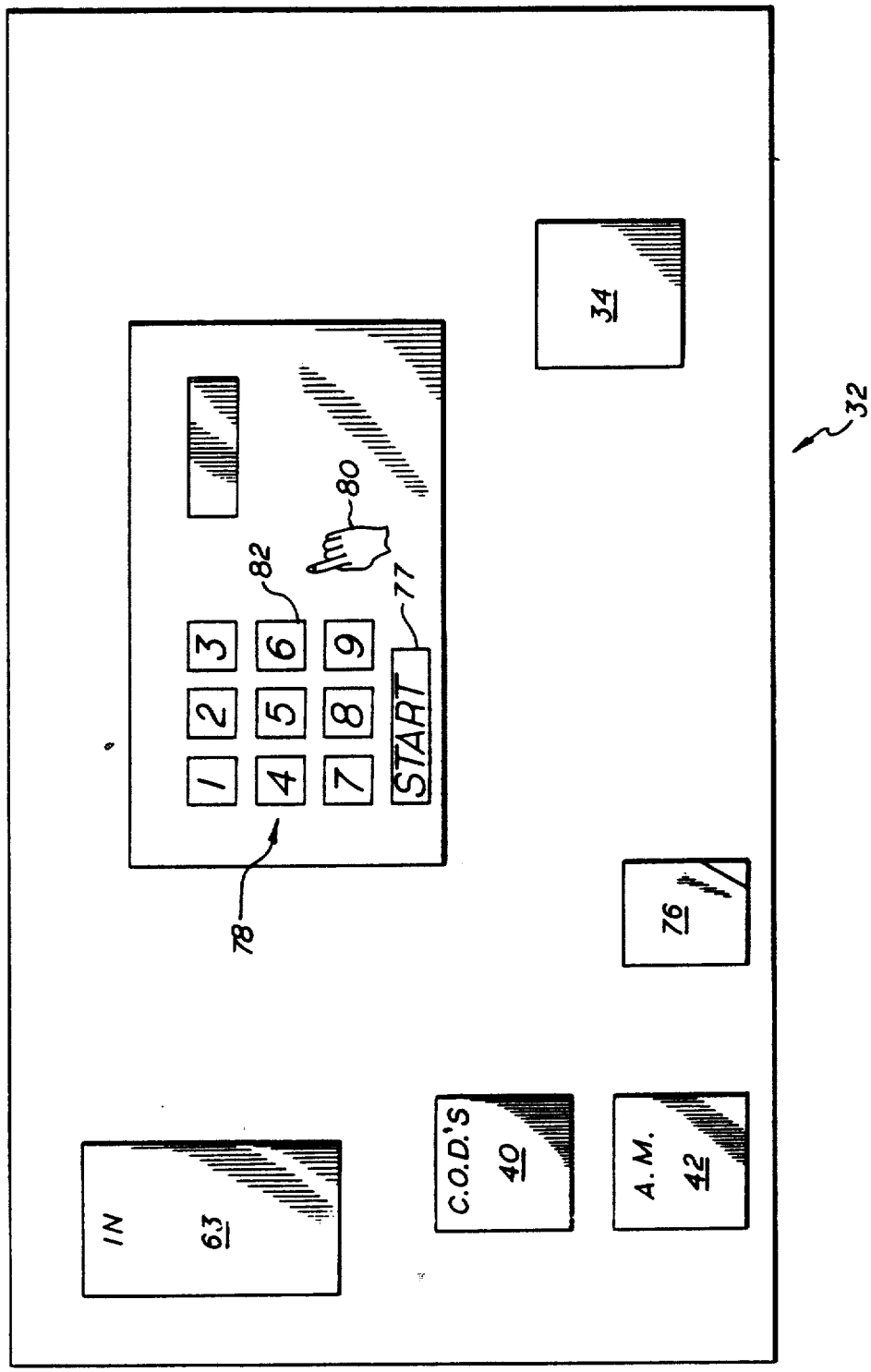

APPARATUS FOR MANIPULATING DOCUMENTS IN A DATA PROCESSING SYSTEM UTILIZING REDUCED IMAGES OF SHEETS OF INFORMATION WHICH ARE MOVABLE

RELATED APPLICATIONS

This application is a continuation-in-part of U.S. patent application Ser. No. 245,419, filed on Sept. 16, 1988, pending for a "Document Manipulation In a Data Processing System", and incorporated herein by reference, which is a continuation-in-part of U.S. patent application Ser. No. 200,091, filed on May 27, 1988, now abandoned. Both of these applications are assigned to the assignee of the present invention.

BACKGROUND OF THE INVENTION

In many of today's businesses, various tasks are not automated by computers. For instance, a word processor enables the reorganizing the rewriting of documents without the retyping known in the past. In addition, various documents may be organized and stored by a computer filing system which allows retrieval by name, by chronological or alphabetical order, or by other user-desired identification. Another example is a mail system on a network of computer terminals which allows messages to be sent to and from users of the network. Also, a phone system may be connected to a mail system which in turn enables phone messages to be stored and later forwarded to users. These and other computer devices enable various daily office tasks to be accomplished more quickly and more efficiently.

However, most computer devices require the user to be computer literate and to learn commands to direct the computer to perform the desired tasks. In more recent computer developments, user interaction with the computer, or as generally referenced in the art, the user interface, comprises menus or a series of commands from which to choose. For each decision juncture during the use of a computer device, an appropriate menu is displayed to the user on the available, proper commands at the juncture. The user only needs to choose the command from the menu which will direct (in part or in full) the computer to perform the desired task. Due to the menu providing the proper possible commands, the user does not have to remember or recall commands to the computer. Hence, the menus are considered to make computer devices more "user friendly".

Although, the choices on a menu generally are descriptive phrases written in terms which are more common to our everyday language rather than in a coded or technical computer language, the descriptive phrases may not initially have meaning, or at least the proper meaning, to a first-time user or a user who is not computer literate. The user does have to learn the respective meaning of each menu choice.

In addition, the input devices through which the user communicates commands or menu selections to the computer pose various complexities. For example, a keyboard requires knowledge of the position of each key in order for a user to use the keyboard proficiently. A mouse, being a relative movement device, requires certain eye-hand coordination and is operated by unnatural movements such as single and double clicking at appropriate times which must be remembered by the user.

In turn, many office personnel do not make use of computer devices because of the time and complexity in learning to operate these devices.

Accordingly, there is a need to make computer devices, and particularly those for office use, more "user friendly" and readily useable especially to first-time and computer illiterate users.

SUMMARY OF THE INVENTION

Like the invention of the parent application, the present invention discloses a computer device which provides a graphically based user interface that simulates an office desk and a users interaction with the items on the desk. The disclosed computer device is employed by a terminal or a network of terminals of a digital processing system. Each terminal typically provides a monitor screen which displays various views to the user, a keyboard which enables typed input to the processing system, and an electronic stylus which enables further user interaction with the digital processing system but in a natural format. For each terminal, an audio input/output assembly may also be connected to the terminal to provide audio input to the digital processing system. In addition, each terminal may be connected to a printer, a scanner and/or a facsimile transmitter and receiver.

In general, the user interacts with the processing system through the electronic stylus in four methods of use of the stylus. An electronic tablet serves as a writing surface on which the stylus is used and spatially corresponds in a one-to-one fashion with the view exhibited on the monitor screen. Other surfaces including the monitor screen may alternatively serve as the writing surface. The first method of use of the stylus, referred to as "touch and lift", enables the selection of a displayed item. One end of the stylus is touched on and removed from the position on the tablet corresponding to the position of a desired item displayed on the monitor screen as indicated by a cursor. The "touch and lift" use of the stylus mimics the familiar press and release motion one employs when making a selection from a machine with depressible buttons.

In a second method of use, one end of the stylus is moved across the surface of the tablet, while in contact therewith, to move a displayed item to a different position in the screen view as indicated by a cursor. Such a method of use, to obtain the described effect, is intuitive to even the most unfamiliar user and is referred to as the "touch and move" method of use. In a third method of use, the user writes with a writing tip end of the stylus in the same manner as he would write with a pencil or pen. Such writing provides annotations to a displayed document or creates a new document. The fourth method of use involves an eraser end of the stylus and provides for the erasure of annotations generated by the writing tip end. The eraser end is used in the same manner as a pencil top eraser. Thus, the third and fourth methods of use of the stylus provide the most commonly expected results. Because the foregoing uses of the stylus consist of known movements and strokes with which any person is familiar and comfortable, and which produce naturally expected results, interaction with the processing system through the stylus and tablet is easily and naturally accomplished.

In accordance with the present invention, a screen view of a computer work area called the user system desk, distinguished from the user's office desk and displayed on the terminal monitor screen, provides a representation of all the documents and accessories which are currently at the users disposal. In general, there are two major views which are displayed on the monitor screen to the user during use of the stylus in the foregoing described manner. Of course, the terminal keyboard and monitor may be used to run various programs and provide numerous other functions, and hence other views may be displayed on the monitor screen. It is in addition to those other views that the present invention provides the desk view (i.e., the screen view of the user's system desk) and an annotation session view during use of the stylus as a writing and erasing implement. The annotation session view and the operations of the processing system associated with that view are discussed in detail in U.S. application Ser. No. 200,091 by Levine et al. for "Document Annotation and Manipulation in a Data Processing System" assigned to the assignee of the present invention. The present invention focuses on the desk view and associated operations of the processing system.

It is the natural format of use of the stylus together with the desk view and its operations that provides the user interface of the present invention which emulates the every-day interaction between a person and his office desk. As a result, the computer device of the present invention is a degree "friendlier" than the menu driven and other devices of today.

In a preferred embodiment, the desk view (i.e. the screen view of the user's system desk) shows a reduced image or "stamp" of one page of each document on the user's system desk or computer work area.

Preferably the representations of documents are miniaturized or reduced images of one page of the document. The reduced images are referred to as stamps and each stamp serves as a unique direct representation, that is, an actual image or pictorial likeness of a certain document on the user system desk as opposed to an indirect symbolic indication such as a prefabricated standard icon or prior art which is used for all documents of a certain type and which identifies a specific document only by a name or title associated with the icon. As used herein the term "icon" does not mean image, Further, the term "document" means various sheets of information whether a single page or multiple page document is involved, and a "sheet of information" includes a body of data which is not an icon and includes, for example, a screen full of data as may be generated by any normally running program.

Preferably, the stamps are formed by an image reduction scheme which reduces a full-screen image of a page of a document to a stamp size image. In the simplest instance of a black and white (or dark and light) image the reduction scheme determines the state of a pixel (black or dark versus white or light) in the stamp-size image from the relative counts of black pixels and white pixels in a corresponding group of pixels in the full-screen image and in neighboring groups of pixels in the full-screen image. In particular, a stamp pixel is determined to be white if the white count (i.e. the number of white pixels) of the corresponding group of original pixels is greater than the average white count of the adjacent groups of original pixels. The stamp-size image pixel is black if its corresponding group of original pixels has a greater black count (i.e. number of black pixels) than the average black count of the adjacent groups of original pixels. And, where the white or black count of the corresponding group of original pixels is the same as the average count of the adjacent groups of original pixels, then the state of the stamp size image pixel is black if the black count of the corresponding group of original pixels exceeds a preestablished threshold (for example, half the pixels in the corresponding group). Alternatively, the reduction scheme may require the black/white counts of the corresponding group of original pixels to differ by a predetermined amount from the average black/white counts of the adjacent groups.

In the case of RGB (red, green, blue) color images, the reduction scheme is more complicated because the coloring of each stamp pixel may be chosen from several colors as opposed to the black or white state in the case of black and white images. In the preferred embodiment, coloring of a stamp pixel is the color of the corresponding group of original pixels where all the original pixels of that group are the same color. If the original pixels of the corresponding group are of different colors then it is determined whether those adjacent other groups of original pixels which have the same colored original pixels throughout a group have the same colored pixels as each other. If so, then coloring of the stamp pixel is determined by emphasizing the difference of the average color of the corresponding group of original pixels with respect to the color of the adjacent other groups which have the same colored original pixels throughout. Otherwise, coloring of the stamp pixel is determined from the average color of the original pixel in the corresponding group.

The stamps can be stacked or rearranged on the system desk by the user manipulating each stamp with the "touch and move" method of use of the electronic stylus. The whole stamp moves in a manner which corresponds to the pattern in which the user moves (i.e. drags), one end of the stylus relative to the predefined writing surface. The whole image of the stamp is displayed in motion on the monitor screen, from a beginning position through intermediate positions to an ending position, during the rearranging and stacking of the stamp on the system desk.

A particular arrangement of the stamps forms an aligned stack of stamps. When a group of stamps is in such an aligned stack, the whole stack may be moved by the user with the "touch and move" method of use of the stylus acting on apparent side regions of the stack. Alternatively, an aligned stack of stamps must be connected to each other by fastening means, such as a paper clip or staple, before the whole stack may be moved by the "touch and move" method of use of the stylus. Preferably, in an aligned stack of stamps, the stamps are removable from the stack in a top down fashion, that is only the top stamp of a stack may be removed from the stack by the "touch and move" use of the stylus, and the succeeding stamp becomes the top stamp of the remaining stack and so on. A "touch and lift" use of the stylus on a stamp provides selection of the stamp. For example, a "touch and lift" of the stylus on a stamp at the top of a stack (aligned or unaligned) or all together unstacked provides a full screen view of the associated document. A "touching" of the stylus on a stamp within an unaligned stack of stamps causes the stamp to be brought to the top of the stack.

Also, in the preferred embodiment, the user's system desk provides trays, folders and/or the like for holding stamps selected by the user. The trays are of two types, active and passive. Active trays may be accessed throughout the network of terminals which communicate with the local terminal of the user. Each active tray is labelled with a name which is recognizable throughout the network. The user, who is the owner of the active tray, authorizes other users access to the active tray. In such a case, an authorized user on another terminal of the network may access the contents of the active tray as well as add to the contents of the tray. A passive tray may be used only by the user of the local terminal.

In one embodiment a folder enables user viewing of stamps contained therein while order of the stamps is maintained.

Another tray labelled "In box" is provided on the user's system desk. This tray is used for delivering mail and new documents to the user, and is coupled to the electronic mail service. The In Box tray differs from active trays in that active trays are accessible by other users of the network only as authorized by the local user.

In addition to selecting which users have access to which active trays, the local user assigns particular types of rights and automatic processes to the active trays per selected user. These assignable rights enable the selected users to access respective active trays in various manners, and the assignable processes enable selected users to alphabetize, time order or to otherwise manipulate the contents of respective active trays. Examples of the assignable rights are "put rights" which enable a selected user to add items to the contents of a certain active tray. "Take rights" enable a selected user to retrieve items from a certain active tray. "Inquiry rights" enable a selected user to ask and obtain information about the contents of a certain active tray. "Rights to copy" enable a selected user to obtain a copy of all or part of the contents of the active tray.

The user's system desk also provides accessories which the user may choose to use in conjunction with the stamps of documents to obtain certain effects. For example, a trash barrel icon provides for disposal of a desired document through its corresponding stamp. Another example is a set of accessories which provide optional functions of the digital processing system. The preferred optional functions or applications include "all done", "scanner", "note pad", "printer", "info", "copier" and "mail". The "all done" application enables a user to return to and resume running of a suspended program which was first running before the system desk view was displayed for current use. The "note pad" application invokes an annotator (i.e. an annotation session screen and functions thereof) and provides a blank new document to be created and annotated by the annotator. The "printer" application enables a user to have a document of a selected stamp printed on a printer. The "info" application enables a user to obtain the history and composition of a document corresponding to a selected stamp. The "copier" application enables a user to make a duplicate of a document as represented by a duplicate stamp. The "mail" application invokes the electronic mail system of the network and enables the user to transfer the document of a selected stamp from the user's system desk to a desired user.

Each of these accessories is preferably represented by a respective illustrative icon. The user selects an application by a touch and lift method of use of the stylus on the position corresponding to the respective icon in the case of the applications of "all done", "scanner" and "note pad". In the case of invoking the "printer", "mail" (i.e. the electronic mail system or "copier", the user moves the stamp of the desired document using the touch and move method of use of the stylus and places the stamp on the respective icon. Likewise, to dispose of a document, the corresponding stamp is placed on an icon of a trash barrel by the "touch and move" operation of the stylus.

The "info" application is invoked by the user moving and positioning the respective icon of the application on a stamp of the document about which information is desired.

Another set of accessories provided by the system desk view includes desk tools for operating on stamps and underlying documents. Examples are a stapler and staple remover. Icons represent such accessories and are moved by the stylus to desired stamps. Upon positioning and leaving the accessory icon (stapler, staple remover) on a stack of stamps, the documents of the stamps become stapled or unstapled accordingly.

Other accessories for network communications or communications to a remote facsimile, for example, may also be provided on the system desk.

In order to provide the foregoing manipulation of stamps, trays, and accessories in addition to the rearranging of the items on the system desk, each tray and accessory item is represented by an icon some of which have different regions that provide different functions. In the case of trays, each tray has four apparent side edge regions, such as top, bottom, right and left sides. Within the four apparent side areas lies an apparent document receiving region in which items are placed to be held in the tray or out of which items are taken from the tray by the touch and move operation of the stylus. The tray may be repositioned by a touch and move use of the stylus on any visible portion of the foregoing parts of the tray. Also each tray is provided with an apparent area for labelling the tray using the erasing and writing operations of the stylus and/or typing from the keyboard.

In the case of the trash barrel icon, the icon has a base region by which the icon is moved with the stylus used in the "touch and move" mode of operation. The icon also has a distinguishable apparent lid through which a retrieval from the trash barrel is made by an initial touching and lifting of the stylus on the lid of the icon.

On the other hand accessories which are currently at the users disposal are represented by icons. The icons and stamps are user movable by the touch and move operation of the stylus on a writing surface. Although the stamps are user stackable on top of each other with multiple use of the touch and move operation, the icons are only able to be placed at the top of a stack of stamps. Placing a stamp on an icon causes the monitor screen to be automatically redrawn such that the icon is shown positioned on top of the stamp.

In another feature of the present invention the stamps are user stackable to form aligned stacks. Upon the user positioning one stamp on top of the other within certain limits (e.g., covering 20%, 40% or 80% of a stamp) the processor automatically forms an aligned stack of the two stamps. The limit within which automatic alignment is activated, is preferably user settable in the manner that other program-defaults for the user are set.

In another feature of the present invention, each icon represents a particular accessory. Operation of that accessory is activated upon the user positioning a stamp and the icon adjacent to each other by the touch and move operation of the stylus on the writing surface. Preferably operation of the accessory represented by the icon is initiated at the lifting of the stylus from the writing surface after positioning the icon and stamp adjacent to each other. Associated with some icons is a series of screen views which further determine the operation of the accessory represented by the icon. In particular, when a stamp is positioned adjacent or on a copy machine icon in the desk view, the processor provides a screen view of a control panel for the user to specify limits of the copy operation to be performed. Using the stylus to select the number of copies, lightness or darkness of copies and/or other features as done at an actual copy machine. Upon selection of a "start button" displayed in the screen view, the processor performs the copy operation within the parameters defined by the users selection.

To further aid the user in operating the stylus to interact with the desk view, a cursor is provided in the screen view before the stylus makes contact with the writing surface. To accomplish this, proximity of the stylus along an axis perpendicular to the writing surface is sensed. When an end of the stylus is within a predefined proximity along the perpendicular axis, the processor generates a cursor on the monitor screen in a position corresponding to the proximal position of the writing surface.

BRIEF DESCRIPTION OF THE DRAWINGS

The foregoing and other objects, features and advantages of the invention will be apparent from the following more particular description of a preferred embodiment of the invention, as illustrated in the accompanying drawings. The drawings are not necessarily to scale, emphasis instead being placed upon illustrating the principles of the invention.

FIG. 1c is a blocked diagram of a table employed in the system of FIG. 1a.

FIG. 2 is an illustration of a desk view displayed during use of the system of FIG. 1a.

FIGS. 2a-2c are illustrations of a desk view displayed during use of the system of FIG. 1a.

FIG. 3a is an illustration of an instruction page for communicating through a facsimile coupled to the system of FIG. 1a.

FIG. 4 is an illustration of the desk view during operation of a printer icon.

FIGS. 4a-4b are illustrations of an image reduction scheme used in the system of FIG. 1a.

FIG. 4c is an illustration of an alternative image reduction scheme.

FIG. 5 is a block diagram of the various applications performed by the system of FIG. 1a.

FIGS. 5a through 5b are block diagrams of the database used in the desk view of the system of FIG. 1a.

FIG. 6 is a flow chart of a supervisor task for implementing operation of a desk application of the system of FIG. 1a.

FIG. 7 is a flow chart of a tablet task for implementing the desk view of the system of FIG. 1a.

DETAILED DESCRIPTION OF A PREFERRED EMBODIMENT

Generally speaking, the present invention discloses a graphically based user interface in a computer device which simulates a desk referred to as the user system desk, and user interaction with items on the desk. In a major screen view of the interface (hereinafter "desk view"), the desk is illustrated with "paper" documents, trays and/or folders for holding documents in user desired order, and various accessories, such as but not limited to, a stapler, mailing means, a trash barrel, a printer means for providing blank paper and a copy machine. All items on the illustrated desk are movable and are able to be placed in any position on the desk by movements of a stylus on a writing surface which mimic human motions of grabbing an item, moving an item, and point to an item to establish selection of an item. The items are indicated on the screen view of the user system desk by icons or illustrated representations, and movements of the stylus with respect to an item are indicated in the screen view by various cursors.

In particular paper documents are illustrated on the user system desk by reduced images called stamps, and items which provide a process or activity are represented on the user system desk by icons. Some icons have various regions which, with certain treatment, provide different operation or use of the item represented by the icon. For example, the icon for a tray is repositioned by a touch and move operation of the stylus on any visible portion (i.e. uncovered by other icons and/or reduced images) of the icon, and the icon enables labelling of the tray by a touch and lift operation of the stylus on the designated label area of the icon followed by a writing/erasing use of the stylus thereon. Hence, different parts of the icon provide different effects with respect to operation of the stylus therewith.

Some icons provide the associated process or activity upon the icon being moved to a stamp of a desired document. Other icons provide the associated process or activity upon a stamp of the desired document being moved to the icon.

Figure 1A:
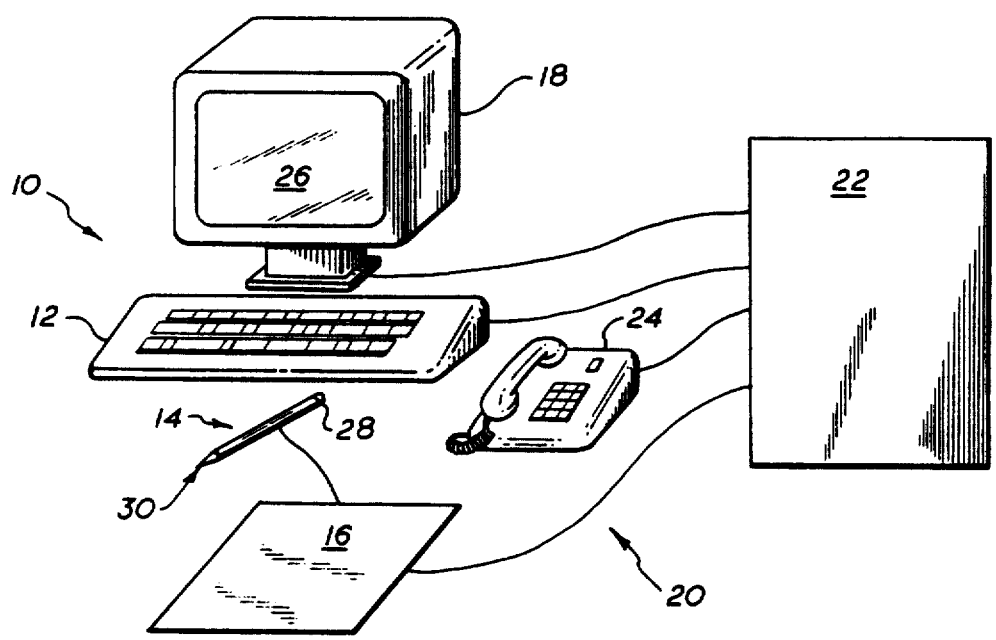
FIG. 1a is a schematic view of a data processing system which embodies the present invention.

The foregoing and other features of the present invention are described in more detail and are more readily understood with reference to a data processing system which embodies the present invention and which is illustrated in FIG. 1a. The data processing system 20 includes a computer terminal 10 with a keyboard 12 and a display unit 18, a two-ended electronic stylus 14 and an electronic tablet 16, all of which are connected to and driven by a digital processor 22. Digital processor 22 may be of a multi-task type but a single task type is assumed in the description of the preferred embodiment. Preferably an audio assembly having an input and output port such as a telephone set 24, is also connected to the terminal 10 for combining audio information with visual information input through the stylus and keyboard 12. In addition, a facsimile and/or network transmitter and receiver 51 is coupled to terminal 10 for providing further communication means.

As used herein, "facsimile" refers to the method of transmitting images or printed matter by electronic means under the standards set forth by the International Telegraph and Telephone Consultative Committee.

It is understood that display unit 18 provides a video display but is not limited to a raster type CRT and may be of an LCD or gas plasma type display unit or of other display technology.

The stylus 14 is used on an upper planar surface of the tablet 16 to perform certain tasks such as repositioning displayed items, or selecting a displayed item for further processing. The actions of the stylus 14 on the surface of the tablet 16 are representatively displayed on the display unit 18 and the positions on the table have a one-to-one correspondence with the view 26 displayed on the display unit 18. Thus as the user applies the stylus 14 to the tablet surface, an image representation of what the user is doing with the stylus is provided in the view 26 of display unit 18.

In the alternative, the tablet and display unit 18 may be a single unit such that the stylus 14 is operated directly on the screen of the display unit 18.

Figure 1B:
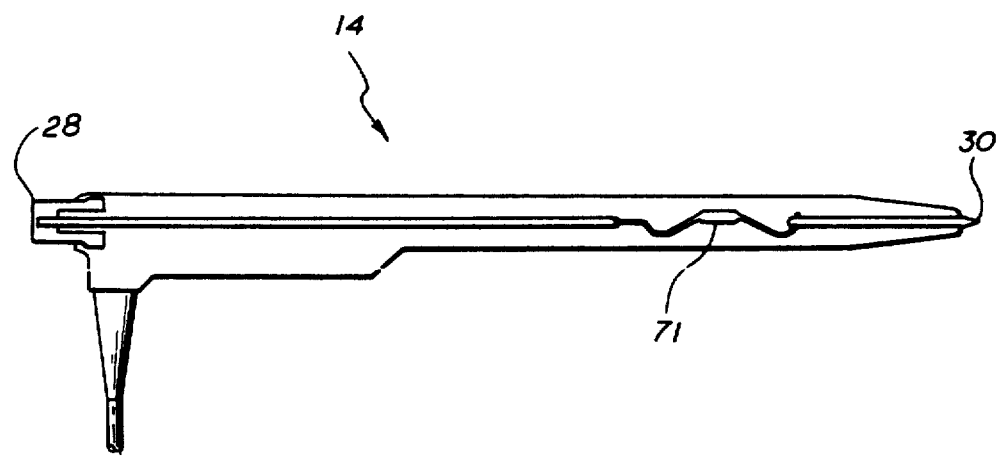
FIG. 1b is a longitudinal section of a two-ended stylus employed in the data processing system of FIG. 1a which may be cordless or wired to a tablet.

The electronic stylus 14 and tablet 16 are generally of the type described in U.S. Pat. Nos. 4,644,102; 4,582,955 and 4,577,057 all to Blesser et al. In particular, the tablet 16 includes a grid of conductive elements, and the stylus 14 contains an electric coil. The coil end of the stylus 14 is inductively coupled to the grid in the tablet 16 by energizing either the coil or the grid with an AC voltage signal. The voltage signal induced in the other component is then measured and used to determine the position of the stylus 14 relative to the grid. The unique features of the electronic stylus 14 and tablet 16 of the present invention are presented in detail in related U.S. patent application Ser. No. 200,091 and are only summarized here. next in conjunction with FIGS. 1b and 1c.

The two-ended stylus 14 operates from either end, the writing tip end 30 or the erasure end 28. When either the writing tip end 30 or the eraser end 28 is in close proximity (about 2 centimeters or less) to the surface of the tablet 16, the writing tip 30 is sensed and indicated in the view 26 of display unit 18 by a cursor. Two factors are used in sensing the proximity of the writing tip 30 of the stylus 14 to the surface of table 16. The factors include a height position on an axis perpendicular to the tablet surface (i.e., z axis) as detected by circuit 69 in FIG. 1c of the tablet 16 and a pressure indication sensed by a pressure transducer 71 in FIG. 1b in the stylus 14. The same factors are used in determining the proximity of the erasure end 28 of the stylus 14 to the table surface, pressure of the erasure end 28 also being detected by pressure transducer 71. When the erasure end 28 is in proximity of the tablet surface and not necessarily in contact therewith, an indication, such as a cursor depicting a pencil top erasure, is displayed in the view 26 of display unit 18 at the position corresponding to the position of the stylus erasure end 28 on the tablet surface. For reasons discussed below, independent z axis and stylus end pressure factors are determined.

To accomplish the foregoing, the tablet 16 comprises an x and y axis sampling circuit, where x and y are orthogonal axes in the plane of the tablet surface, and a separate z axis sampling circuit.

Figure 1C:
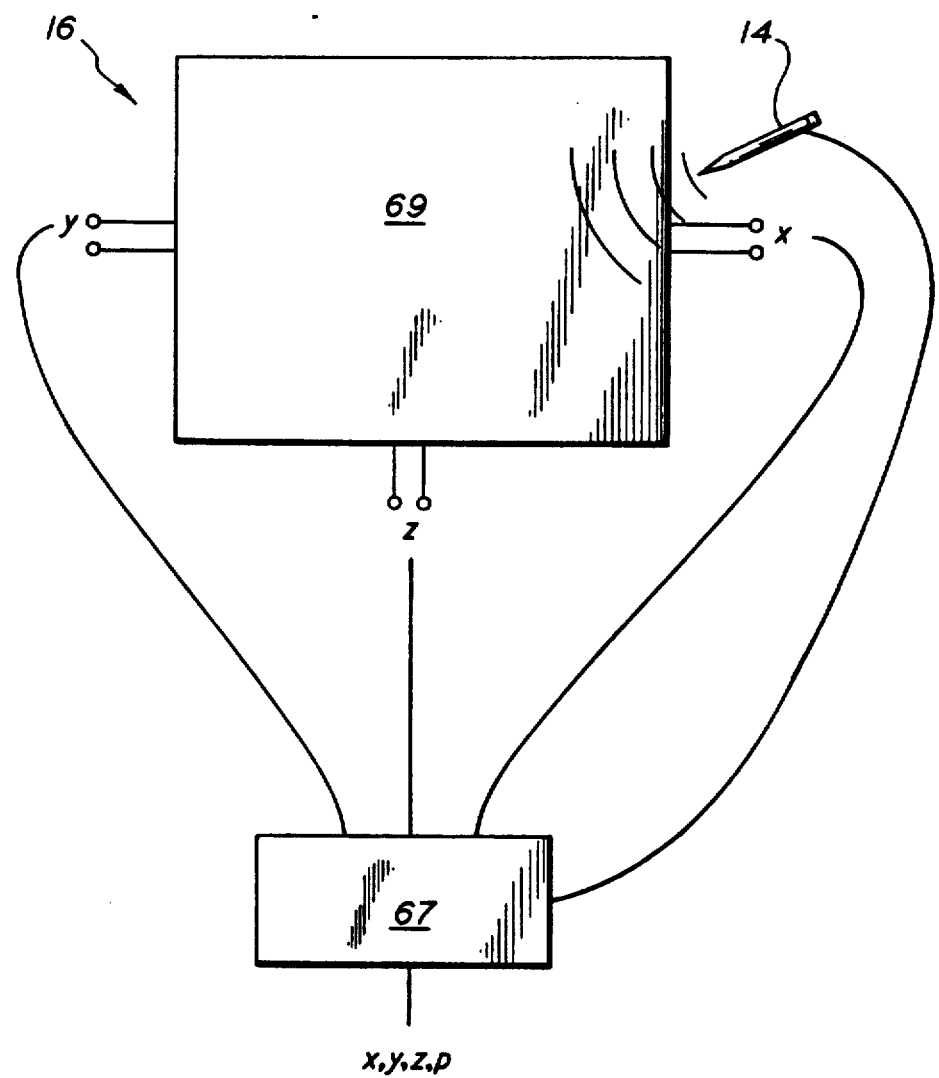

It is understood that a multiplicity of loop configurations for the sensing coils forming the x and y axis and the z axis sampling circuits are known in the art. Hence, FIG. 1c provides a block diagram of tablet 16 with blocked area 69 generally referring to the sensing coils of the x and y axis and z axis circuits. It is noted, however, that positional phase discrepancies of the tablet sensing coils can be corrected computationally in tablet processor 67 or by a higher resolution loop such as a separate z axis sensing loop used in the present invention. The x and y axis and z axis sampling circuits operate on a predetermined schedule and generate signals at x, y and z in FIG. 1c. The signals are subsequently received and digitized into respective quantitative values by tablet processor 67. The digitized values are used by processor 22 of FIG. 1a in a relationship known in the art to provide an indication of position of the stylus 14 relative to the tablet 16 along the x, y and z axes.

In the preferred embodiments, the z axis sampling circuit senses stylus end height and transfers indicative signals to tablet processor 67 which transmits z axis height values to processor 22. Along with the z axis values, tablet processor 67 transmits to processor 22 quantitative, multivalue pressure measurements p (FIG. 1c) and corresponding x and y values for the stylus end. The processor 22 uses the transferred height and pressure values to determine proximity of the stylus end in relation to the tablet surface. It is noted that such a determination is based on multivalue, quantitative measurements in contrast to ualitative, yes/no indications used in existing devices.

In addition, the writing tip end 30 and the erasure end 28 of the stylus are alternately driven by tablet processor 67 of FIG. 1c. When one end is moved into and sensed in proximity of the tablet surface, then just that end is driven. The driven stylus end responds to four different manners of operation to provide four different effects. A "touch and lift" operation is used for selecting an item exhibited on display unit 18. Preferably, once the writing tip end 30 or the erasure end 28 makes contact with the tablet surface, the "touch" part of the operation is defined, but the user must lift the stylus end 28, 30 from the tablet surface within the succeeding second or so to define the "lift" portion of the operation. If the user delays in lifting stylus end 28, 30, then the "touch and lift" operation is not invoked, and no effect results.

A "touch and move" manner of operation enables the user to move a displayed item anywhere in the view 26 of display unit 18. The operation is invoked upon the user placing the writing tip end 30 or the erasure end 28 on the tablet surface and moving the stylus end 28, 30 while maintaining it in contact with the tablet surface for more than a preset number of pixels, for example, four pixels.

The third and fourth manners of operation depend on the stylus end being driven. In the case of the writing tip end 30 of the stylus 14, use of the end 30 in a writing manner inserts markings on a chosen displayed "writing" area. In the case of the erasure end 28 being driven, erasing with the erasure end 28 deletes certain writing tip end markings or portions thereof. In particular, the eraser end 28 when driven along allows operation in a manner which removes markings or parts thereof that have been made by the writing tip end 30 within the same session of writing/erasing on a chosen displayed item. Further, the eraser end 28 removes markings in a wider band than the band in which the writing tip end 30 writes. Whether movement of the stylus causes writing/erasure or movement of an item depends on whether a writing surface is displayed and whether the cursor is at the edge or center of the writing surface.

Optionally, the stylus 14 may be of other designs, for example, single working ended. In that case, erasure may be provided through keyboard operations or the like.

Figure 2:
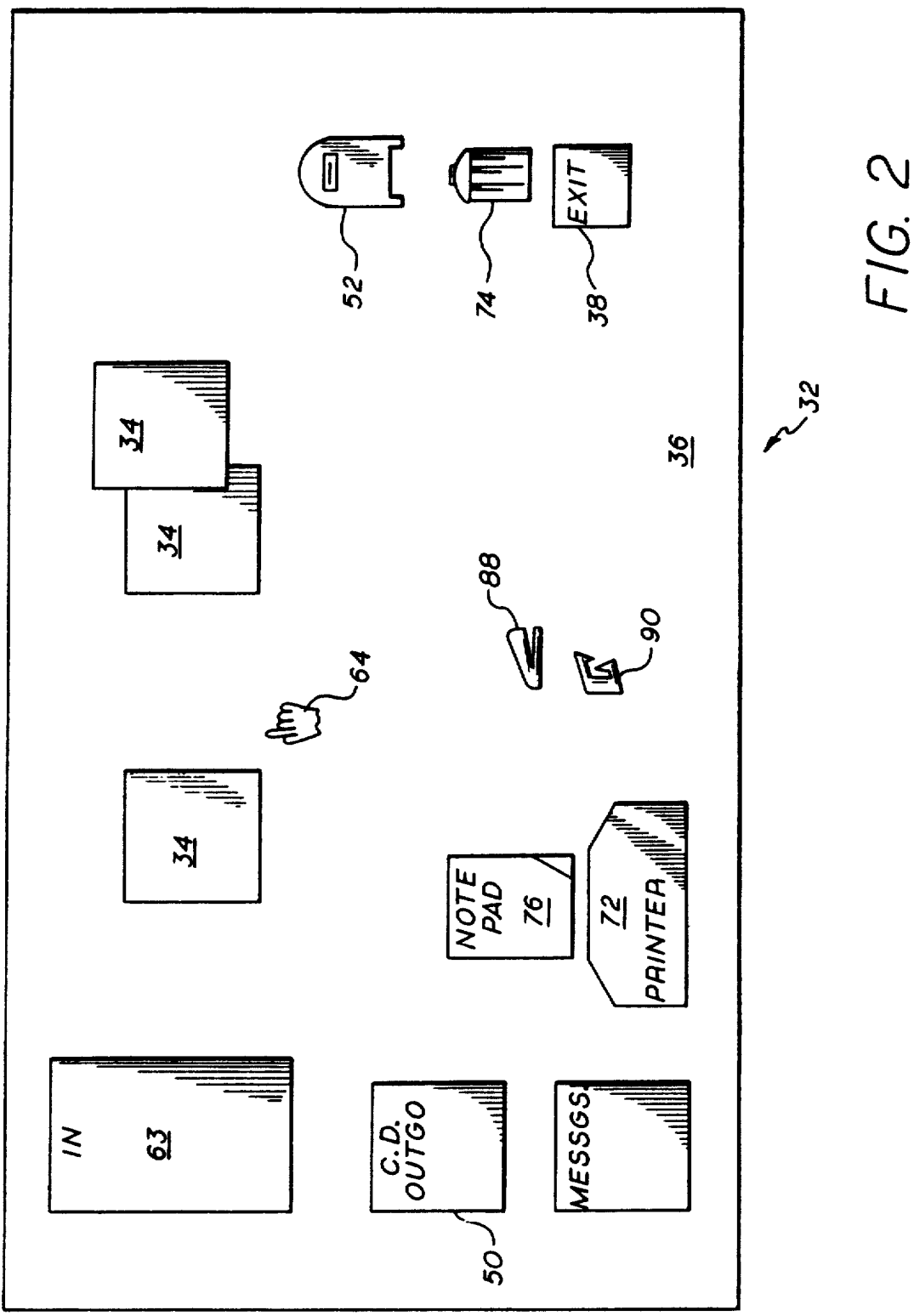

Cursor indications for the above described operations of the stylus 14 on tablet 16 are provided by known methods but are displayed when a stylus end enters the sensed proximity of the tablet surface in contrast to when the stylus end makes contact with the tablet surface. In a preferred embodiment, a cursor replicating a sharpened pencil tip is displayed when a writing surface is displayed, and the writing tip end 30 of stylus 14 is in proximity of the tablet surface and thereafter used for writing. An erasure top cursor is displayed when the erasure end 28 of the stylus 14 is in proximity of the tablet surface and thereafter used for erasing. As generally shown in FIG. 2, a cursor 64 replicating a hand with the index finger positioned in a pointing fashion is displayed when a writing surface is not displayed and either end of the stylus 14 is in proximity and thereafter used in the "touch and lift" method for selecting a displayed item. The cursor 69 moves in correspondence with movement of stylus 14 while the stylus end is in proximity of the tablet surface and during operation in the "touch and lift" manner.

Figure 3:
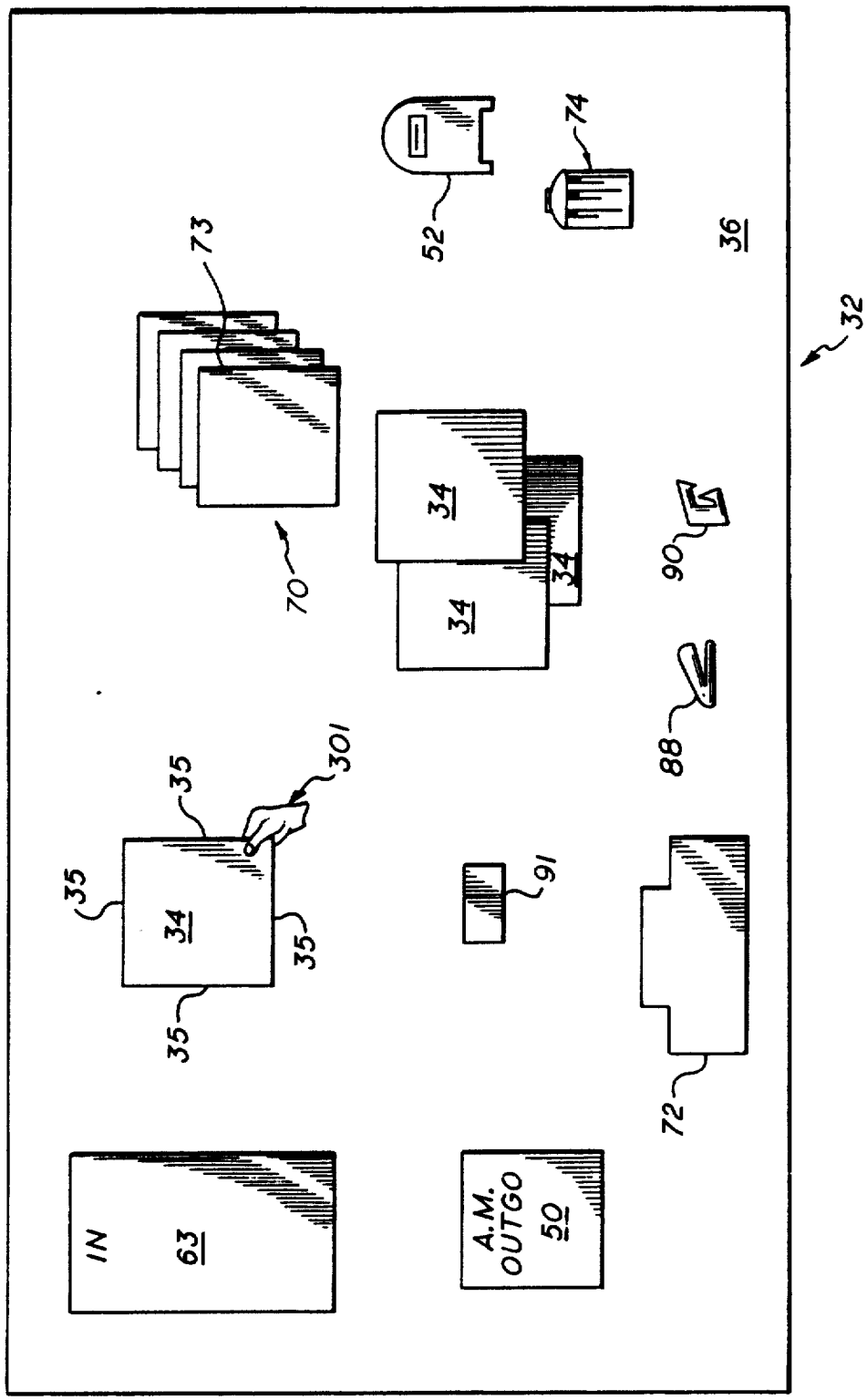
FIG. 3 is an illustration of a desk view in which stamps of documents are being stacked by a user.

A close-fisted hand cursor 301 is displayed upon either end of the stylus 14 making contact with the tablet surface and thereafter used to grab and move a displayed item in the "touch and move" method of use shown in FIG. 3. Specifically, the cursor 301 may be used to grab a document stamp, tray or accessory on the desk, or may be used to grab the edge of a displayed writing surface to move the surface. Other cursors may be used to provide the illustrative indication of the manners in which stylus 14 is being used.

As illustrated in FIGS. 2 and 3, the desk view 32 is central to the various tasks and applications of the system 20 and serves as a visual portion of the interface between the user and the digital processor 22. In a preferred embodiment, the desk view 32 provides a user's system desk 36 which represents the computer work area of the user and appears as the background of the desk view 32. On the system desk 36, the desk view 32 provides miniaturized images or stamps 34 of various documents which have been created and/or annotated by annotation capabilites of system 20, some documents of which originated from a screen capture of the view displayed during interruption of a previously running program. Although the stamp representations of the documents are specifically similar to icons, the stamps 34 are more functional and informative than icons. In particular, various direct treatment and direct manipulation of stamps 34 in desk view 32 are accomplished by applying the different stylus operations to the stamps.

For instance, the full-screen image of a document may be viewed on screen 26 from the desk view 32 by selection of the corresponding stamp 34. Selection of a stamp 34 during the desk view 32 is accomplished by the touching and lifting of one end of stylus 14 on the tablet position which corresponds to a position within bounds of the corresponding stamp 34 in the desk view 32. Upon completion of the touch and lift operation of the stylus 14, a full screen view of the document is displayed on display unit 18. Thereafter the document may be annotated in full screen view by the stylus 14 operated in its writing and erasing manners, by the keyboard 12 and by audio input through the audio assembly 24.

Also the stamps 34 of the user's document may be directly moved around on the system desk 36 by the user operating the writing tip end 30 or erasure end 28 of the stylus 14 in the "touch and move" manner with respect to any region within bounds of the stamps 34 shown in FIG. 3. That is, to reposition stamp 34, the user points with and places and end 28, 30 of stylus 14 on a position on the tablet surface which corresponds to a position on or enclosed within border 35 of the desired document stamp 34 as displayed in the desk view 32. The user then drags the stylus end 28, 30 across the surface of tablet 16 to the desired position on tablet 16 which corresponds to the desired ending position in the desk view 32, and removes the stylus end 28, 30 from the tablet surface. During the dragging of the stylus end 28, 30 across the tablet surface, the display unit 18 shows the stamp 34 of the desired document being moved from its initial position through various intermediate positions to the desired position on the system desk 36 in correspondence with the dragging of the stylus end across the surface of the tablet. When the user lifts the stylus end 28, 30 off the tablet surface, the user stops operation of the stylus in the "touch and move" manner and thus ends the ability to move the document stamp 34 on the system desk 36.

Preferably, the cursor 301 depicting a close-fisted hand is illuminated adjacent one side of the document stamp 34 by which the stamp appears to be moved as shown in FIG. 3. The close-fisted hand cursor 301 and adjacent document stamp 34 move in the same pattern along the desk view as the stylus end 28, 30 moves along the tablet surface.

By multiple use of the "touch and move" operation described above, document stamps 34 may also be stacked in certain desired groups established by the user. Within a stacked group of stamps 34, a stamp 34 may be automatically brought to the top of the stack by a touching of a stylus end on the tablet position which corresponds to a visible portion (i.e. not hidden within the stack) of the stamp 34. Selection of the stamp 34 on the top of the stack, by the previously described touch and lift method of use of the stylus 14, provides a full screen view of the document represented by the stamp 34. In stacking the stamps 34, if the outer edge of the borders 35 of any two partially stacked stamps are within a predefined distance apart from each other, then processor 22 automatically aligns the two stamps to form an aligned stack 70 shown in FIG. 3. Any other stamps 34 placed on stack 70 within the predetermined border edge limits are also automatically aligned with the rest of the stamps in stack 70. Other aligned stacks 70 may similarly be formed.

An aligned stack 70 behaves somewhat like a single stamp. Specifically, movement of the whole stack 70 is accomplished by the touch and move operation of the stylus 14 on side regions 73 of the aligned stack, and selection of the top stamp 75 of the stack provides a full screen view of the associated document. The stamp 75 on top of the aligned stack 70 is the only stamp in the stack which may be selected and/or removed from the aligned stack 70 by the operations of the stylus.

The graphical representation of the automatic aligning of stamps 34 is referred to as "snapping to" because the stamps within the predefined side region limits of each other appear to cooperate with each other in a manner which quickly positions one exactly on top of the other. As the stack 70 grows, incremental offsets between stamps of the tack are provided to provide a 3-D illustration of the stack.

Known routines in the algorithms are used to provide the automatic alignment of stamps and to provide the 3-D illustration of the formed stack of stamps. In a preferred embodiment of the present invention, however, the routine employs a variable to determine the predefined border edge limits at which automatic alignment is invoked. The value of the variable is user settable through a system management routine which enables the user to predefine program defaults and the like.

In addition to the various stamps 34 of documents, various icons are provided in desk view 32 which represent operations of processor 22 that the user can elect to perform from system desk 36. One depository is preferably labelled in "In Box" 63 and serves as a tray for receiving all new documents created by the user and any mail sent to the user by electronic mail as shown in FIG. 2a. The In Box is globally known and is interfaced to the preestablished electronic mail system, and thus accessible for mail purposes throughout a network of terminals to which system 20 belongs. Common addressing techniques are used.

The user-owner of the system desk 36 may establish other trays on the system desk 36 in two types. Both types of trays, active and passive, hold stamps 34 selected by the user and provide means for organizing items, especially stamps 34, on the system desk 36 as shown in FIG. 2a. An active tray 40 may be accessed throughout the network of terminals which communicate with the local terminal 10 of the user-owner. Hence, active trays 40 may hold items provided to the local user by other users. Each active tray 40 is labelled with a user specified name which is recognizable to other users throughout the network. Processor 22 accordingly provides a globally accessible address which corresponds to the named tray.

For each active tray 40, the user-owner of the active tray specifies to the processor 22 the other users which are authorized to access the active tray. In addition, the user-owner specifies desired automatic processes and particular rights of each chosen user of an active tray 40. The automatic processes enable the selected users to alphabetize, chronologically order or otherwise manipulate the contents of a respective active tray. The user-owner specifiable rights enable the selected users to access respective active trays in various manners. In particular, "put rights" are specified to the processor 22 to enable a selected user to add items to a certain active tray 40. "Take rights" are specified to enable a selected user to retrieve items from a certain active tray 40. "Inquiry rights" are specified to enable a selected user to ask and obtain information about the contents of a certain active tray 40. "Rights to copy" are specified to enable a selected user to obtain a copy of the current contents of a certain active tray 40. One or a combination of the foregoing automatic processes and/or rights may be specified for each user per active tray 40.

Typical data structures and control means are employed by the processor 22 to determine which users have what automatic processes and/or rights to each active tray 40. Upon establishment of an active tray 40, the users enabled to access the tray and the automatic processes and/or rights of each selected user, and the name of the active tray 40 is automatically (i.e. by processor means) listed in each selected user's electronic phone book listing. Preferably the name of the active tray 40 and the specified automatic processes and/or rights to the tray for the specified user is listed under the name of the user-owner of the active tray 40. Several means of active trays, each with several chosen rights, may thus appear in the specified user's phone book listing under other users' names.

In contrast to the active trays, a passive tray 42 may be accessed only by the user of the local terminal 10. A user establishes a passive tray 42 by providing a local name, that is one which is not known throughout any network of terminals.

As shown in FIG. 2a, all icons of the trays (In Box 63, active trays 40, passive trays 42) generally appear to be rectangular in shape with a central region 48 for receiving document stamps or other items. Another portion 44 of the rectangular shape provides a writing surface or labelling area for a desired name to be inserted. In the case of passive trays 42 the user is able to directly write with the stylus 14 or to type with keyboard 12 in the labelling area 44 a desired name for the tray. Preferably, a touch and lift use of the stylus 14 on a position on tablet 16 corresponding to a position on he labelling portion 44 initiates a window process for labelling the tray 42. The window is preferably the size of the label portion 44. Within the initiated window, a pencil tip or eraser cursor is displayed and a subsequent scribing motion of the writing tip end 30 on the tablet position corresponding to the labelling portion 44 of the tray generates the user chosen name of the tray on that portion of the tray in the user's handwriting. Similarly, by positioning a type cursor 46, with the touch and move method of use of the stylus 14, on the labelling portion 44 and thereafter typing the tray's name via keyboard 12 produces a typewritten version of the tray's name on the labelling portion 44. Further, a combination of typing through keyboard 12 and writing with stylus 14 to produce the tray's name on the labelling portion 44 of the tray may be used. Stylus markings or portions thereof may be erased by rubbing eraser end 28 of stylus 14 on the tablet position corresponding to the desired stylus markings or portions thereof in desk view 32. A menu-pick from a menu associated with the window enables termination of the window process initiated to label the tray and returns the user to the desk view 32 with the tray labelled as desired.

In addition, for each tray icon 63, 40, 42, any portion of the tray which is not covered by any stamp or item being held by the tray, is used to reposition the tray on the user's system desk 36 by the touch and move operation of the stylus 14, in the same manner that a stamp 34 is repositioned. It is understood that if the tray is holding a stamp or other items, the contents move with the repositioning of the tray as expected with an everyday tray holding papers on a office desk. Such repositioning of the tray 40, 42, 63 with the stylus 14 is distinguished from the scribing on the tray with stylus 14 due to the regional part of the tray icon on which the user acts with the stylus 14. Further, when a user manually retrieves a stamp 34 from a tray using the touch and move operation of the stylus 14 on the stamp 34, the user must operate on or within the stamp border 35 to move the stamp 34 out of the tray (FIG. 2a). Processor 22 recognizes such retrieval of a stamp 34 from a tray to be different than the repositioning of the tray holding the stamp 34 by the stylus operating on the stamp 34 versus a visible portion (i.e. uncovered) of the tray.

Other stamp holding elements may be used in lieu of or in combination with the trays 40, 42. For example, folders 45 may be used to similarly hold stamps in a user desired order as illustrated in FIG. 2b. A touching and lifting of the stylus 14 on a labelling portion of a folder 45 initiates a window process for labelling which is similar to that described above for trays 42. A touch and lift of the stylus 14 on a remaining portion of the folder 45 selects the folder such that the folder opens and displays the stamps contained therein. The stamps 34 may be moved from a front side up position on the left side of the open folder to a front side down position on the left side of the folder by the touch and move operation of the stylus 14 on the stamps 34 in the folder 45. Such operation of the stamps 34 in the folder allows the user to scan through the stamps while maintaining the order of the stamps. This feature mimics the familiar actions used with actual papers which are to be kept in a desired order within a folder or the like. With the touch and move operation of the stylus, other stamps may be added to a desired side of the folder 45 automatically assuming a respective front side up or front side down position to further ensure maintenance of the desired order. Stamps 34 when removed from the folder 45 assume a front side up position to enable individual display in the desk view 32. The folder 45 is closed by a touch and lift of the stylus on a visible portion of the inside of the folder. The folder, opened or closed, is repositioned in the desk view 32 by the touch and move operation of the stylus 14 on the remaining (i.e. not labelling) portion of the folder 45.

Other depository areas in desk view 32 are designated by icons labelled with names of other users in communication with the terminal 10 of the user. These named depository icons 50 serve as outgoing mail drops for the user to send documents to a particular user as illustrated in FIG. 2a. To send documents to other users who do not have an associated named depository on the user's system desk 36, the pre-existing electronic mail system of a network of terminals is used. An icon representing a mailbox 52 provides the user with the services of the electronic mail system.

To mail a document to a user through a named depository icon 50 or to request the services of the electronic mail system, the user uses the "touch and move" method of use of the writing tip end 30 or eraser end 28 of stylus 14 on the position on the tablet 16 which corresponds to a position on the stamp 34 of the document desired to be mailed. The user moves the stamp 34 of the desired document and places the stamp on top of the named depository icon 50 or on top of the mailbox icon 52 in the desk view 32. When the user lifts the stylus end 28, 30, the processor 22 performs the electronic mailing accordingly using known electronic mail methods.

In the preferred embodiment, the leaving of a stamp 34 on the mailbox icon 52 activates a send-mail routine which provides a graphical interface in the form of an address book 83 shown in FIG. 2c. The address book 83 serves as a workstation directory of all users of the system 20 of FIG. 1a or of a network of such systems. When the send-mail routine is activated, processor 22 exhibits an illustration of a common address book 83 with lettered tabs 85 arranged in alphabetical order along one side of the address book 83. To select a recipient of the document represented by the stamp 34 used to activate the send-mail routine, the user opens the address book 83 to the name of the desired recipient. This is accomplished by the user touching and lifting an end of stylus 14 on the tablet position which corresponds to the screen position of the lettered tab 85 that indicates the first letter of the last name of the desired recipient. Upon such action, the selected tab 85 is illuminated in reverse video form to indicate to the user that the letter indicated on tab 85 has been selected. The names of potential recipients/users of the system 20 whose last name begin with the chosen letter of the alphabet are displayed along with their phone number and names of any of their trays to which the user has access.

The user selects a recipient's name, from the displayed page in the opened address book 83, by the touch and lift use of one end of stylus 14. To aid in eye-hand coordination during selection with the stylus 14, the area displayed around a listed name is illuminated in reverse video form when the stylus end is positioned near the tablet position which corresponds to the listed name. Once a listed name is chosen, an asterisk appears beside the listed name. In the same manner, the user may choose other recipients to simultaneously receive the document of the subject stamp by changing pages and choosing desired names on various pages in address book 83. A recipient may be unselected in the same manner as he was selected. Further, an option 81 to quit/send no mail is available at all times to allow the user to cancel the mailing process. After all desired recipients have been chosen, a final touch and lift use of the stylus 14 to select a send mail option 79 enables the mailing process to be executed.

In the preferred embodiment, it is valuable to be able to mail a document comprising text, graphics, images, written annotations and voice data between different workstations or terminals 10. At each workstation 10, system 20 employs a router routine for packing and transferring files associated with a stamp of a document from the terminal 10 to a network server or pertinent device drivers. The router routine packages, in a predefined format which is acceptable by the network server or device drivers, the necessary files which include an index file, image data file, graphics file, text file, and written annotations and voice data files. The index file holds the addresses of the desired recipients. The router routine transfers the formatted package to the network server along with the addresses of the chosen recipients. The pre-existing electronic mail program, in communication with the network server, recognizes the transferred package and recipient addresses, and subsequently delivers the files of the document to appropriate trays (i.e. In Box 63 or named active tray 40) on the system desks of the chosen recipients.

The address of a chosen recipient may be a network memory address, a facsimile number, a PC Local Area Network number, a PBX identification number, and/or a standard data modem address. In the case of a facsimile address, the router routine converts text files and annotations from vector to raster image form during packaging due to the image-only handling requirement of facsimile machines.

In the same manner, system 20 at each workstation 10 employs the router routine for receiving and unpacking mail sent to the local user. In particular, the router routine prompts the user of the incoming mail and the line over which the mail is being sent to system 20. The router routine then provides necessary handshaking and timing protocol between the systems 20 network server or device driver servicing the sending party over a PC LAN or network line. When the sending party is communicating over a facsimile line no such handshaking is possible, hence image data is sent without delay to facsimile machine 51 coupled to system 20. Upon receipt of the incoming package, the router routine obtains from the received package the necessary files associated with the subject document, and subsequently places the files in local memory. The stamp representing the received mail is displayed in the In Box 63 in the desk view 32 of the receiving user to indicate to the user that new information is available from his system desk 36.

To further provide the user with a graphical indication of the processor 22 sending mail and/or receiving mail, an image of a mailbag may be exhibited during execution of the router routine for each document mailed or received. The mailbag is illustrated with the insertion or removal of pieces of paper, each representing a different file associated with a document, to provide an indication of the number of files of each document.

In order to implement communication through facsimile from the system 20, a facsimile modem card is coupled to the processor (e.g., a personal computer) which the supports workstation terminal 10 (FIG. 1a) or a stand along facsimile machine 51 is interfaced with the workstation digital processor 22. With either configuration installed at a first and second, or more, workstations 10, the first and second workstations 10 are able to communicate with each other via facsimile. The data able to be communicated in this case is not just image data. Instead voice data, text data, image data and all written annotations of a document are able to be sent back and forth between the two workstations 10 through the respective facsimile machines. This is accomplished by the network server or device driver communicating with the modem of the facsimile machine and thus bypassing the original manufactured facsimile protocol which requires that only machine recognizable images be sent and/or received.

In addition, communication by a user from a remote facsimile to his workstation 10 is made possible by the foregoing configuration. Communication is initiated by a specially designed instruction page illustrated in FIG. 3a. The user completes the instruction page by supplying the number of the remote facsimile which he is using and the desired commands such as "send messages in Box". Once completed, the instruction page is sent through the remote facsimile to the facsimile coupled to the user's workstation 10. The router routine at the user's workstation 10 is programmed to recognize the special instruction page, and thereafter packages the specified commands from the instruction page into proper form for processing by processor 22. In turn, processor 22 searches the specified desk item or system desk 36 and obtains the requested documents or manipulates the specified documents as request.

In the case of a command to retrieve certain documents, the router routine packages the data obtained from processor 22 with the remote facsimile number which was previously provided by the user on the instruction page and transmits the data to the remote facsimile. The user at the remote facsimile subsequently receives the documents he requested on the instruction page.

It is understood that various and numerous commands may be similarly communicated to the user'-workstation 10 from the remote facsimile. Examples of the variety of commands and thus extensive control over the user's system desk 36 are instructions for rearranging the items in the desk view 32, instructions for retrieving documents of stamps in the desk view 32, instructions for providing a current image of the desk view 32 to aid the user in deciding further instruction, and combinations thereof. Also the current image of the desk view 32 provided to the remote user from the workstation 10, may be return transmitted (i.e. from the remote user to the workstation 10) with further instruction from the user.

Also provided in desk view 32 as illustrated in FIG. 2a is "printer" icon 72. Using the touch and move operation of the stylus 14 on a stamp 34, the user moves the stamp 34 of the desired document and positions the stamp 34 on the printer icon 72. After the user moves the stamp 34 onto printer icon 72, and lifts the stylus end 28, 30 from the tablet surface, the processor 22 performs a routine to provide printing of the document represented by stamp 34 at a connected printer.

In a preferred embodiment, an illustration of push button controls 78 commonly employed by typical photo copy machines id displayed to prompt the user to enter the number of copies desired to be generated as shown in FIG. 4. To select a desired number, the user uses the "touch and lift" method of use of one end of the stylus 14 on the tablet position corresponding to the illustrated button 82 which designates the desired number of copies. A cursor 80 illustrating a hand with an extended index finer mimics the "touch and lift" motion of the stylus 14 and gives the illusion of the user depressing the desired button 82 as he normally would on a photo copy machine. After entering the number of desired copies, the user completes the request for document printing by touching and lifting the stylus end on corresponding start button 77. Upon completion of a request for document printing, the document is printed in paper form on a local printer connected to processor 22, and the corresponding stamp 34 is automatically returned to its position on system desk 36 prior to the request for printing.

Repositioning of the printer icon 72 in desk view 32 is accomplished by operating the stylus in the touch and move manner on any part of icon 72 similar to repositioning depository icons 50, 52 and/or stamps 34 in the desk view 32.

The copy machine icon 87 also illustrated in FIG. 2a operates in a manner similar to the operation of the printer icon 72 but provides a duplicate of a desired document through its corresponding stamp 34. Using the touch and move method of use of the stylus 14, the desired stamp 34 is moved onto printer icon 72. Upon the user lifting the stylus 14, the processor 22 provides the generation of a duplicate of the stamp positioned on the copy machine icon 87 and returns the stamp 34 to its position on system desk 36 prior to the request for copying it. The generated duplicate stamp is first displayed in the In Box 63 or underneath copier 87, or at another suitable position in the desk view 32.

Repositioning of the copier icon 87 is the same as repositioning the printer icon 72.

The trash barrel icon 74 provides means for disposing of documents as shown in FIG. 2a. Repositioning of trash barrel icon 74 is by a touching and moving use of the stylus on a base portion 86 of the icon which is preferably highlighted when pointed to by the cursor corresponding to the working end of the stylus 14. Disposing of a document is performed by placing a corresponding stamp 34 on the illustrated trash barrel 74 using the touch and move operation of the stylus on the desired stamp 34. Upon the user leaving the stamp 34 on the trash barrel icon 74, the processor stores the stamp accordingly. A subsequent positioning of the stylus end over the lid 84 of the trash barrel icon 74 causes the lid 84 to be highlighted to indicate to the user that a stamp has been disposed in the trash barrel. Removal of a disposed item is by the user touching a stylus end 28, 30 on a tablet position corresponding to the lid 84 of trash and moving the stylus end 28, 30 in contact with the tablet surface to a position which corresponds to an area outside of trash barrel 74. The last item to have been placed in the trash barrel 74 is the first item to be retrieved by the foregoing method. Other ordering of items for retrieval may be used depending on the data structure employed to implement the trash barrel 74 which is, in general, a disk storage area.

According to the foregoing, processor 22 must distinguish treatment through the lid 84 from that to the base 86 of trash barrel 74.

Other icons in desk view 32 provide processor operations to provide a new piece of paper (e.g. to create a new document) 76, to scan into system 20 a desired image 89 and to return to a working program 38 as shown in FIG. 2a. Selection of these operations is by the user touching and lifting one end 28, 30 of the stylus 14 on the position on the tablet 16 corresponding to the screen position of the respective icons 76, 89, 38. Further details of the processor operations for providing a new piece of paper and for returning to a working program are provided in the prior referenced U.S. patent application Ser. No. 200,091. The processor operation for scanning an image preferably operates a scanner coupled to processor 22 in workstation 10. The image being scanned may be displayed on display unit 18 during the scanning. Upon completion of the scanning a menu pick or other means allows the user to return to the desk view 32 with a stamp of the scanned image delivered to the In Box 63.

As shown in FIG. 2a, the desk view 32 also displays an icon 55 for providing information particular to the document corresponding to a desired stamp 34. The icon 55 is moved to the desired stamp with the touch and move operation of the stylus 14. Upon releasing the icon 55 on the stamp 34, the processor 22 generates text stating who has annotated the document, when and the basic contents of the annotations, and thus the history of the compiling of the document. The icon 55 thereafter is automatically returned to its position before it was moved to the desired stamp.

Icon 55 may be repositioned in the desk view 32 like the above mentioned icons and stamps 34.

Two further accessories provided by the desk view 32 are a stapler 88 and a stapler remover 90. Like the other accessories, icons of stapler 88 and staple remover 90 are repositionable by the touch and move operation of the stylus 14 and are operational by a positioning of the icon relative to a desired stamp. Both accessories operate in a similar manner and require their icons being moved to subject stamps 34 rather than the stamps 34 being moved to their icons for operation. The icons provide indications of various accessories such as, but not limited to, a mailbox 52, a printer 72, a stapler 88 and a copy machine 91. Using the "touch and move" operation of the stylus 14, the user moves an icon of an accessory or a stamp 34 of a desired document and positions each relative to the other. Some icons initiate operations of processor 22 by the placing of the icon on a stamp 34 of a desired document. Other icons initiate operations of processor 22 by a stamp being positioned on top of the icon. Specifically, the icon of the stapler 88 provides stapling of a previously aligned stack of stamps. Preferably, the user places an end of stylus 14 on the tablet position which corresponds to the sides of the stapler icon 88 and moves the stapler icon 88 with the "touch and move" operation of the stylus to the previously stacked stamps 34 which represent the documents desired to be stapled. Once the stapler icon 88 is positioned over the desired stack of stamps, the user lifts the stylus end 28, 30 from the tablet surface. Upon the lifting of the stylus end, the processor 22 staples the stamps 34 and corresponding documents of the subject stack. The stapler icon 88 is then automatically returned to its position in the desk view prior to the user moving it to the desired stack of stamps 34.

Preferably, the user places an end of the stylus 14 on the tablet position which corresponds to the sides of the stapler icon 88 (or staple remover icon 90) and moves the stapler icon 88 (or staple remover icon 90) with the touch and move operation of stylus 14 to the previously stacked stamps 34 which represent the documents desired to be stapled (unstapled). In the case of stapling, the stamps are previously positioned by the user in an aligned stack in the order desired for stapling. In the case of unstapling, the stack of stamps holds stamps 34 in an order fixed by a prior stapling. Once the staple icon 88 (staple remover icon 90) is positioned over the desired stack of stamps 34 to be stapled (unstapled), the user lifts the stylus end 28, 30 from the tablet surface. Upon the lifting of the stylus end the processor 22 staples (unstaples) the stamps 34 and corresponding documents. The stapler icon 88 (staple remover icon 90) is automatically returned to its position in the desk view prior to moving it to the desired stack of stamps.

Once stapled together, stamps 34 act as expected. That is, the stapled stamps move together and are able to be stacked with single stamps 34, stacked stamps 34 and/or stapled stamps. Newly unstapled stamps 34 return to their form prior to stapling. They may be single stamps or previously stapled stamps which may be further unstapled. Hence, the stamps behave in a manner which simulates the behavior of paper documents in everyday usage and the user interface of desk view 32 provides computer automation of everyday usage without complicated commands or complex user-to-computer protocol.

In the situation where the user positions a stamp 34 over stapler 88 in desk view 32, the processor 22 does not allow the stamp to remain on top of the stapler icon 88. Preferably, the processor 22 redraws the desk view 32 such that the stapler icon 88 is positioned on top of the stamp 34.

A staple remover icon 90 for removing staples is operated similarly to the stapler, and is similarly automatically redrawn on top of a stamp 34 when a user positions a stamp 34 over it.

In the case of the printer 72, mailbox 52 and copier 91, operation is as follows. Using the "touch and move" operation of the stylus 14 on a stamp 34 of a desired document, the user moves the stamp 34 and positions the stamp on the desired icon (printer 72, mailbox 52 or copier 91). After the user moves the stamp 34 onto the icon, and lifts the stylus end 28, 30 from the tablet surface, the processor 22 performs a routine to provide the respective process (mailing, printing or copying) of the document represented by the stamp 34. The process is performed through means connected to the user's terminal 10, such as electronic mail services a printer or a copy machine.

In the preferred embodiment, the lifting of the stylus end 28, 30 from the tablet surface after moving the stamp onto or adjacent the subject icon, initiates the respective process. Initiation of the respective process is illustrated to the user through the display unit 18 by a visual representation which corresponds to the chosen process/icon. In the case of the mailbox icon 52, an image of a mailbag is exhibited with a graphical indication of processor 22 inserting pieces of mail into the mailbag. In the case of the printer or copier icon 72, 91, an illustration of pushbutton control panel 78 shown in FIG. 4 is displayed. Pushbutton control panel 78 mimics the control panels commonly employed by a typical photocopy machine or printer. The pushbutton control 78 is displayed to prompt the user to enter the number of copies desired to be generated. To select a desired number, the user uses the "touch and lift" method of use of one end of stylus 14 on the tablet position corresponding to the illustrated button 82 which designates the desired number of copies. A cursor 80 illustrating a hand with an extended index finger mimics the "touch and lift" motion of the stylus 14 and gives the illusion of the user depressing the desired button 82 as he would actually do on a photocopy or printing machine. After entering the number of desired copies, the user completes the request for document printing or copying by touching and lifting the stylus end on corresponding start button 77. Upon completion of a request for document printing or copying, the document is printed in paper form on a local printer connected to the processor 22 or copied within system 20. Thereafter, the corresponding stamp 34 is automatically returned to its initial position on system desk 36 prior to the request for printing or copying.

The foregoing has described specific accessories or processor operations provided in the desk view 32. In general, the accessories are of three classes of moveable icons: desk tools (e.g. stapler), applications activated with a document (e.g. mail, trash barrel), and applications activated without a document, (e.g. note pad, all done). However, other types of accessories such as facsimile transfer of documents may be included and similarly implemented. Further, upon initiation of the system 20, the various icons corresponding to the different accessories may be prearranged along one or more sides of the system desk 36. Alternatively a default initial desk view 32 may contain the In Box 63 and a catalogue type interface with which the user places an order, that is selects, desired accessories. The icons of selected accessories appear in the In Box and are subsequently removed from the In Box and arranged on the system desk 36 by the user operating the stylus 14 in the touch and move mode. In any case after initially obtaining accessory icons on the system desk 36, the icons may be subsequently rearranged by the user by the touch and move operation of the stylus 14. Also as described above, stamps 34 and trays alike may be rearranged by the user as he likes. Further, the desk view 32 maintains the new arrangement of items until the user rearranges the items again. Such freedom in repositioning items on the system desk 36, with the confidence that the items will stay in one arrangement until moved by the user, further enhances the simulation of a user's interaction with a common everyday desk.

Stamp Generation

Each stamp 34 is actually a reduced image of a page of the corresponding document which the stamp represents. In a preferred embodiment, the original image (1024 pixels by 1024 pixels for example) of a document page is reduced by a factor of 8 to form a 128 pixel by 128 pixel stamp image. Reduction by a factor of other amounts would be suitable. Most importantly, the reduced image provides a sufficient portrayal of the corresponding document to be readily recognizable by the user upon a first glance with solid dark or light areas appearing solid and with thin lines and other details exaggerated so that they in fact appear in the reduced image. Such visual identification simulates the same in everyday interaction with a common desk.

In the case of black and white images, that is images formed of binary pixels which are either "on" (white) or "off" (black) the image could be reduced by simply creating a black (off) or white (on) pixel of the reduced image dependent on whether the number of black pixels in the corresponding block of pixels of the larger image exceeds some predefined threshold. However, more information can be retained to make stamps more recognizable by utilizing some form of contrast enhancement in the reduction process.

In such a case of black and white, binary pixel original images, the image reduction scheme employed by the present invention to form black and white stamps 34 is illustrated in FIGS. 4a and 4b. The original image 65 is partitioned into blocks 54, 56, ... 70, ... n, each of 8 original pixels by 8 original pixels (i.e. 64 original pixels per block). Each bock 54, 56, ... 70, ... n corresponds to one pixel 54' ... n' of the stamp image 34. For simplicity in illustration, the same reference numeral is used to label the 8×8 block of original pixels and the corresponding pixel of stamp 34 but the reference numeral is primed to indicate a stamp image pixel. It is understood that each block corresponds to a different stamp pixel and that each block of original pixels has a black count (i.e. the number of pixels whose state is black or "off") and a white count (i.e. the number of pixels whose state is white or "on") which together total 64. The relative counts (black count or white count) of the block of original pixels with respect to the average counts of adjacent blocks determines the state (i.e. black or white) of the corresponding stamp image pixel. Stamp image pixels which form the border of the stamp are all of the same state, preferably black.

In a specific example, the state of stamp pixel 62' is determined by the black or white count of corresponding block 62 relative to the average black or white count of adjacent blocks 54, 56, 58, 60, 64, 66, 68 and 70. The black or white count of corresponding block 62 is the number of black or white pixels, respectively, and the sum of the black and white counts is 64, the number of original pixels which compose block 62. Similarly, the average counts of the adjacent blocks 54, 56, 58, 60, 64, 66, 68 and 70 are determined by the average number of black pixels and the average number of white pixels in the blocks. Say for example, 11 of the 64 original pixels in block 62 are black and 71 of the original pixels throughout adjacent blocks 54, 56, 58, 60, 64, 66, 68 and 70 are black. Block 62 is then determined to have a black count which is greater than the average black count of the adjacent blocks which would need a total of 88 black original pixels (i.e. an average black count of 11 in each of the eight adjacent blocks) to match the black count of block 62. Corresponding stamp pixel 62' is thus assigned a state of black. In the same way, if the white count of block 62 were greater than the average white count of the adjacent blocks then corresponding stamp pixel 62' would be assigned a state of white. If the black or white count of block 62 matches the respective average black or white count of the adjacent blocks, then the state of corresponding stamp pixel 62' is black if the black count of block 62 exceeds a predefined threshold, for example 32. The state of each non-border stamp pixel is similarly determined from the black and white counts of a corresponding block of original pixels and blocks adjacent thereto.

Alternatively, the rule may be that the black or white count of a block of original pixels (e.g. block 62) must be greater than the respective average black or white count of the adjacent blocks (e.g. blocks 54, 56, 58, 60, 64, 66, 68 and 70) by a predetermined amount in order for the corresponding stamp pixel (e.g. pixel 62') to be black or white respectively. Where the relative count of the original pixel block (block 62) is not sufficiently greater than the average count of the adjacent blocks to follow that rule, the corresponding stamp pixel (pixel 62') is black if the black count of the respective original pixel block (block 62) equals or exceeds the white count of that block (block 62).

As previously mentioned, the foregoing image reduction scheme is particularly suited for original images 65 which are black and white as opposed to multicolored. In the case of a multi-colored, including a grey scale, original image, the following image reduction scheme is employed by the present invention. Although the following discussion specifically illustrates reduction of an RGB (red, green, blue) image, it is understood that a grey scale image may be likewise reduced where the byte value of a pixel indicates an intensity of brightness.

In a colored image, the coloring of each pixel is formed of a red component, a green component and/or a blue component in contrast to the binary state of black or white in the case of black and white images. Each possible or available pixel coloring, in system 20, formed by various combinations and amounts of red, green and blue is preferably represented numerically by a byte value typically in the range of 0 to 255 where an 8-bit byte is used to hold the byte value. Each of the 256 byte values and hence each pixel color available in system 20 is listed in a color lookup table which, for a given byte value, identifies the amount of red, green and blue in the color corresponding to the byte value. In addition, each subvolume of a regularized partitioning of color space, such as a 3-D color space having orthogonal axes representing intensity of red, green and blue, is mapped to one of the 256 byte values and hence one of the available pixel colors in system 20. Thus, from a desired set of red, green and blue values, an automated procedure can quickly determine the byte value whose lookup table color most closely matches the desired RGB combination.

The multi-color image reduction scheme of the present invention employs the color lookup table and regularized mapping between color space and byte values to determine from an original multicolor image 57 the byte value and thus coloring of each stamp pixel in a stamp of the image 57 as illustrated by the following example shown in FIG. 4c. Like the previously described image reduction scheme, the original image 57 is divided into uniform blocks of 8×8 pixels which each correspond to one stamp pixel in the stamp of the original image 57. If all the original image pixels of a block have the same byte values and thus are the same color, the block is said to have a solid color, and the stamp pixel which corresponds to the block is assigned the same byte value and hence the same color. The blocks in FIG. 4c numbered with a zero, two or five illustrate such a solid colored block where each numeral designates a different color and similar numbered blocks are the same solid color.

If a block comprises pixels of different byte values and thus different colors, such as block 61 in FIG. 4c, then it must be determined whether there exists a unique identifiable background color in the adjacent blocks. If no adjacent blocks have solid colors, or two or more adjacent blocks have solid colors different from each other (e.g. the blocks with colors, 0,2 and 5), then it is determined that no unique identifiable background color exists in this area of image 57. In this case, for each pixel in block 61, the byte value/color of the pixel is located in the color lookup table which in turn provides the amount of red, green and/or blue in the coloring of that pixel. From the provided amounts of red, green and blue, a sum amount of each component ($\Sigma r$, $\Sigma g$, $\Sigma b$) is obtained for the block 61. The sum amounts ($\Sigma r$, $\Sigma g$, $\Sigma b$), scaled or averaged as necessary, determine a position in the regularized partitioning of color space which in turn identifies the most appropriate of the 256 available colors to represent block 61 in the stamp image. That byte value/color is assigned to the stamp pixel corresponding to block 61.

If a block comprises pixels of different byte values/colors, such as block 93, and if those adjacent blocks which have solid colors (i.e. same byte values for each pixel therein) are of the same solid color as each other, namely color zero, then a unique identifiable background color exists in this neighborhood of the adjacent blocks. To preserve the foreground details provided by the pixels of block 93 in contrast to the thus detected background, the 3-D color space of orthogonal axes representing intensity of red, green and blue is used to determine the byte value/color of the stamp pixel which corresponds to block 93. The sum amounts of red, green and blue of all pixels in block 93 is obtained through the lookup table in the same manner as described for block 61 above. From the sum amounts are determined average red, green and blue amounts which define a first point in the 3-D color space. The byte value of the detected background color, color zero, is located in the lookup table which provides associated red, green, blue amounts that define a second point in the 3-D color space. A point in the 3-D color space which is even further away from the second point than is the first point, and thus exaggerates or emphasizes the difference between the detected background color and the color comprised of the average red, green and blue amounts of block 93, is selected to define the color of the stamp pixel corresponding to block 93. The selected point is mapped to a byte value according to the regularized partitioning of color space, and that byte value is assigned to the corresponding stamp pixel.

The remaining blocks are processed similarly to provide a stamp image with pixels colored to form a diagonal line among pixels colored 0, 2, and 5 corresponding to blocks of the same colors in the original image.

The foregoing image reduction schemes ensure feature retention, that is, the preservation of some degree of detail of the original image in the stamp image. It may not be possible to preserve by prior known schemes fairly fine details such as a narrow or short offset color line of the original image due to the limited number of pixels in the stamp image. However, by the herein described schemes, the narrow line or subtle details of the original image produce a relatively effect in the stamp image such that the stamp image as a whole is a more detailed or information preserving reduction of the original image. The above description of the stamp image resulting from the reduction of the original image shown in FIG. 4c is an example of the degree of detail maintained from the image reduction schemes of the present invention.

To accomplish the foregoing image reduction schemes for multi-colored or black and white images, the necessary original image pixel information may be obtained from a full page representation stored in memory. The determination of sum color of a block and hence adjacent blocks is thus accomplished in a line by line manner as the screen view 26 is refreshed. Stamp pixel colors are computed once the necessary block information is obtained. As the stamp pixel colors are computed, they are stored in an adequately sized RAM. Thereafter, that RAM provides the display of the stamp image 34 throughout operation of the processing system 20.

Software Details

The features of system 20 (FIG. 1) are provided by an Annotator-Desk task program 25 outlined in FIG. 5. The desk view 32 and functions corresponding therewith are driven by a desk application routine 19 which is one of several application routines in the Annotator-Desk task program 25, a program which runs in an interrupt to or suspension of a previously running program. Other application routines in the Annotator-Desk task program 25 are for driving the annotator 21, or the printer 72, etc. The relationship of the desk view 32 to the other mentioned applications (i.e. note pad 27, printer 72, mail, All Done, Annotator) is illustrated in FIG. 5.

An Applications Dispatcher (not shown) oversees all applications of the Annotator-Desk task. The Applications Dispatcher uses a set of codes agreed upon by all applications to determine which application routine is to be executed. The code for requesting the desk application routine 19 is preferably initiated from within the Annotator application 21. In other embodiments, the Applications Dispatcher may be initialized with the code for the desk application routine 19. Subsequent to receipt of the code for the desk application routine 19 and after execution of the last requested application routine, the Applications Dispatcher enables execution of the desk application routine 19.

The foregoing features and operations of system 20 are provided by a desk application routine and a desk database. The desk application routine is formed of two subroutine tasks, the supervisor task 15 of FIG. 6 and tablet state diagram task 17 of FIG. 7. The supervisor task 15 and tablet task 17 share and manipulate the desk database which holds information that keeps track of the items currently on the user system desk 36.

Figure 5A:
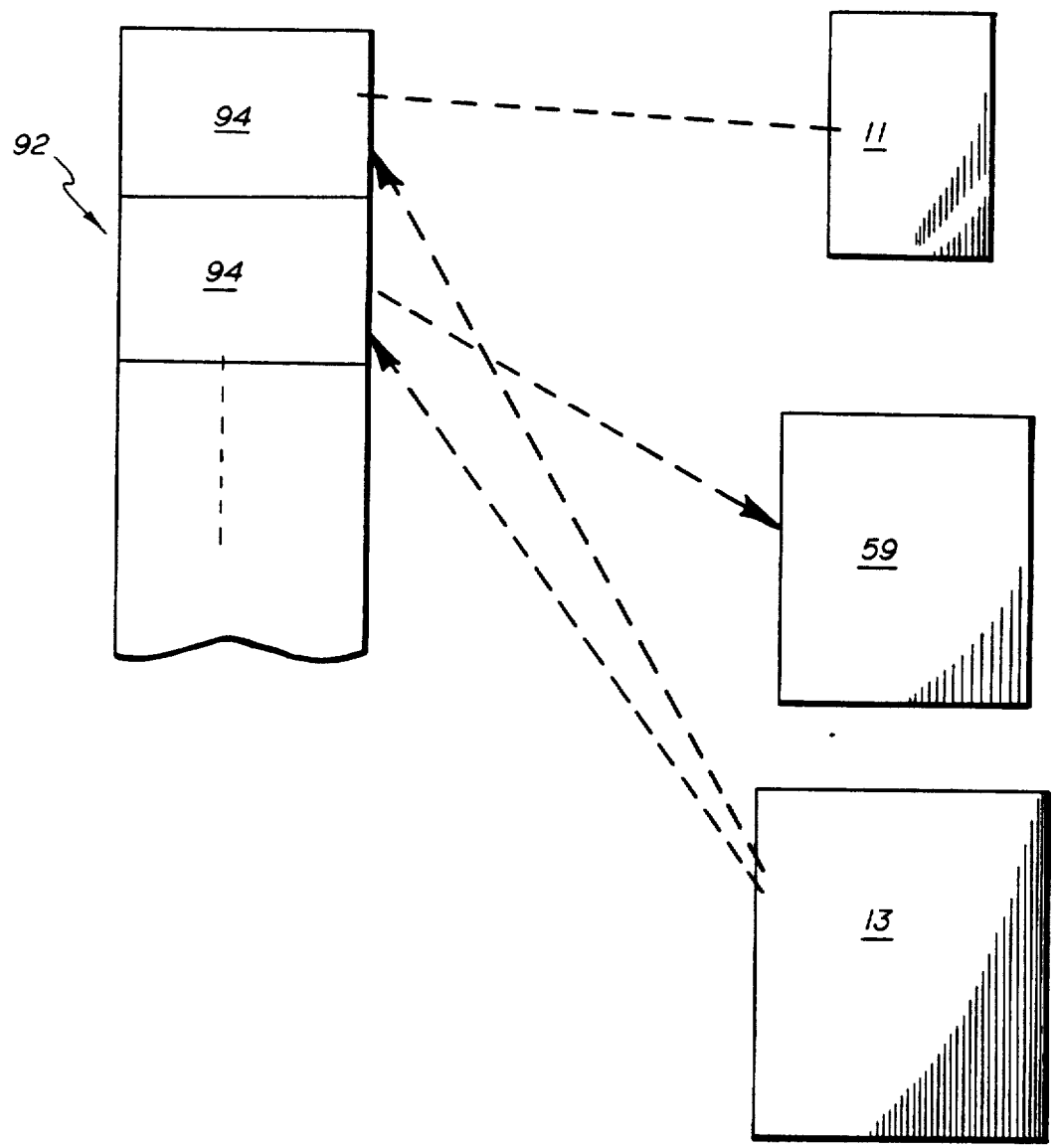

Specifically as illustrated in FIG. 5a, the desk database comprises a doubly linked list 92 for indicating attributes of each item in the desk view 32, a file 11 of stamp images, and icon file 59 containing the various icons used to represent the other desk items, and a file 13 in which the bit map of the current desk view 32 is stored. Each entry 94 in doubly linked list 92 describes an item in the desk view 32.

Figure 5B:
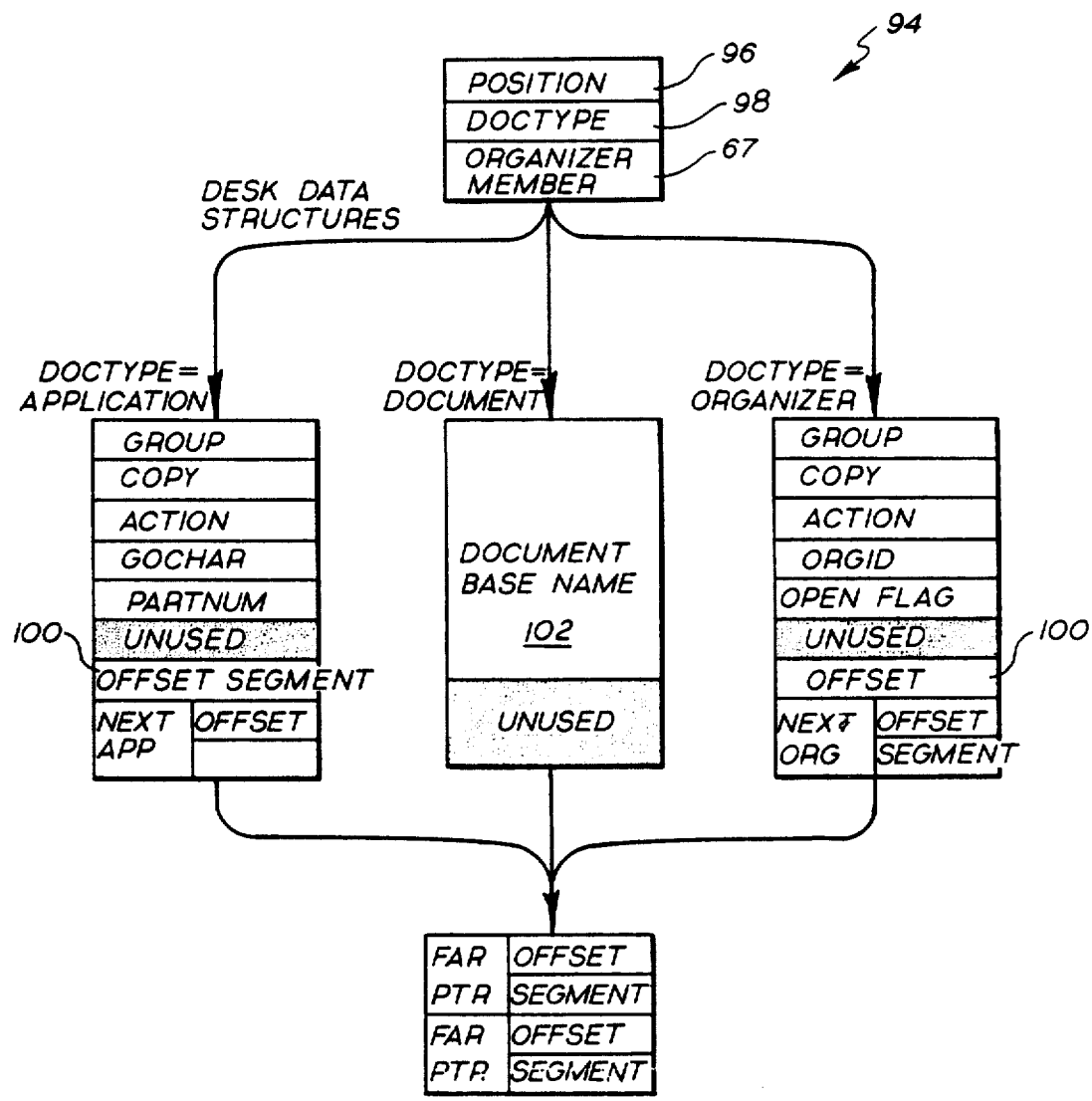

In particular as shown in FIG. 5b, each entry 94 specifies in respective fields 96, 98 the position of the item in the desk view 32, and whether the item is a document stamp, tray icon, icon for an aligned stack of stamps, icon of a depository, or an accessory icon. Also a placement field 60 specifies whether the item is currently positioned in a tray, folder or other holding device. If the item is a stamp, the placement field 60 also indicates whether the stamp is on top of or in a stack, or not included in any stack. Also depending on the type of item indicated in type field 98, the processor 22 attributes certain predefined characteristics to the item such as the class of moveable icon (desk tool, activate with stamp, activate without stamp) as designated in allocated fields. To that end, if a stamp is indicated in type field 98, then the processor 22 does not allow the stamp to remain on top of icons of desk tools such as the stapler and staple remover. Preferably the processor 22 displays the desk tool icon automatically repositioned on top of the stamp after a user has placed a stamp on the desk tool icon.

The file location of the reduced image or icon of the item is specified in a respective field 100 (or is found implicitly through the physical memory address of the entry 94 in the case of a stamp) of entry 94 by an address or other indication of the associated position in the stamp file 11 or icon file 59. Further, in the case of a document stamp, a table of contents (called a superfile) listing all files, such as voice annotation files, visual annotation files and image files, of the corresponding document is locatable by the name provided in the name field 102.

The entries 94 are changeably linked in order of most recently used item at the top of the list 92 to least recently used item at the bottom of the list 92. Each entry 94 has a first link to the preceeding entry 94 and a second link to the succeeding entry 94, both links of which are used in ordering and reordering entries 94.

Figure 6:
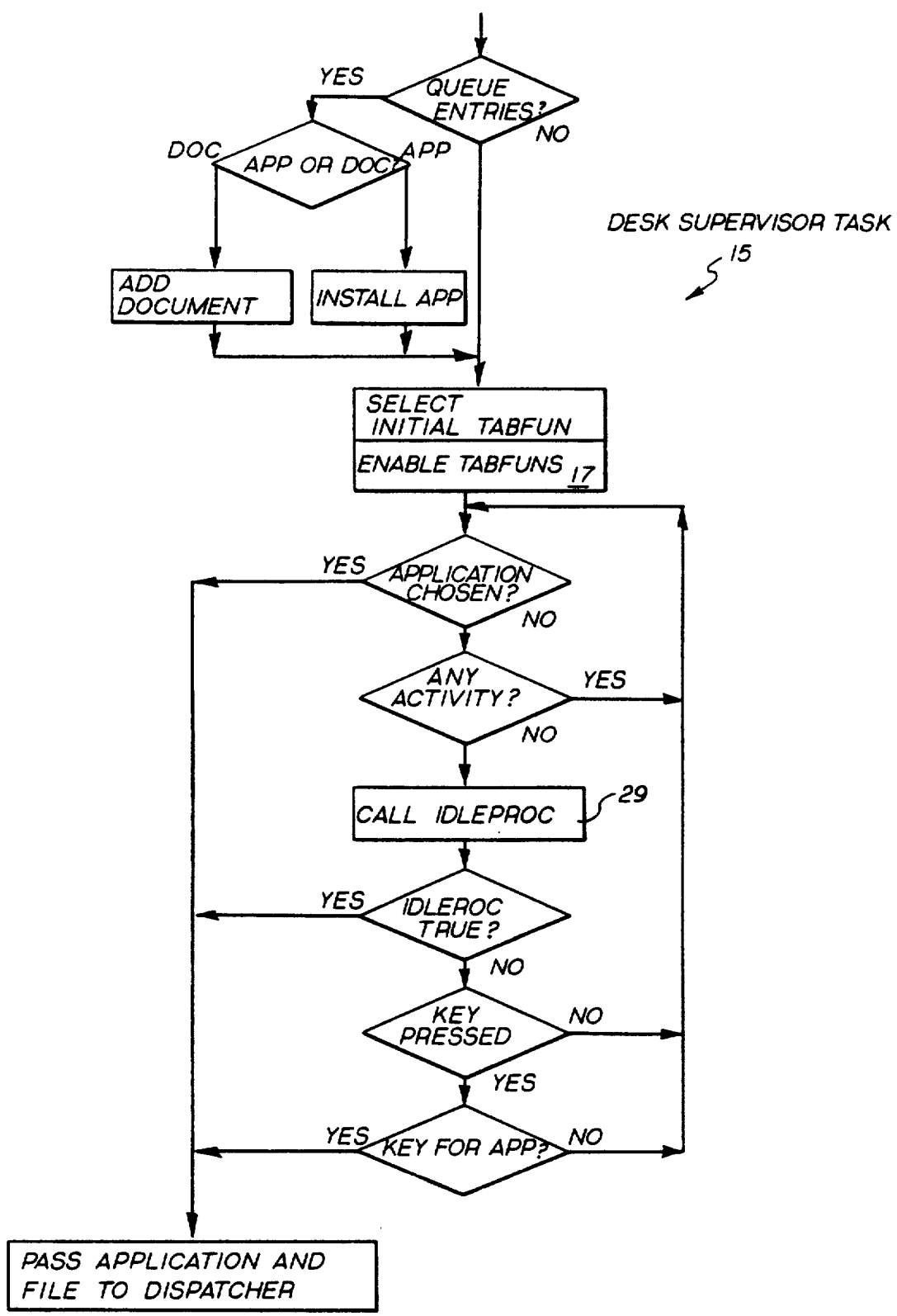
Figure 7:
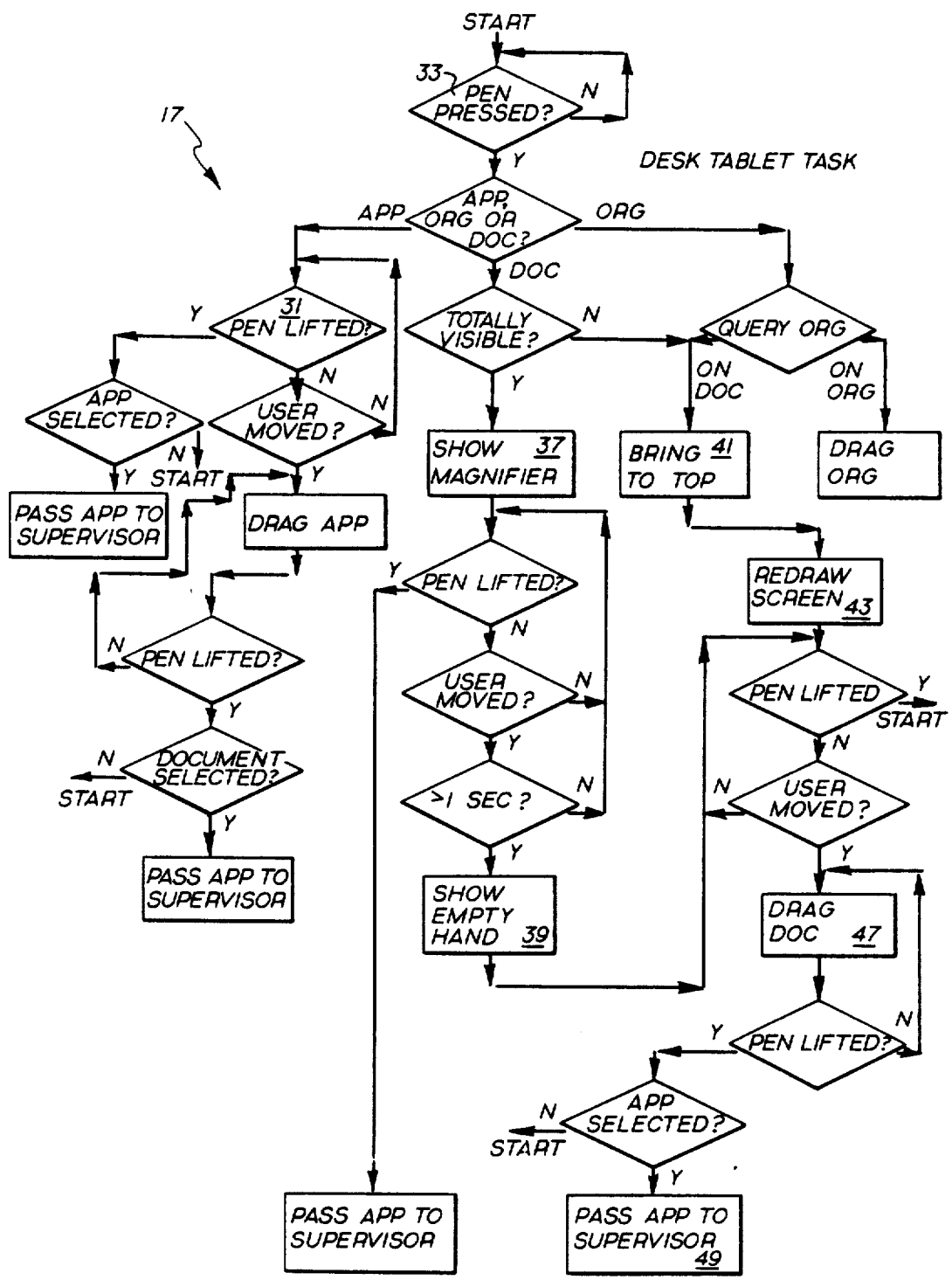

Now making reference to FIG. 6 and the operation of the supervisor task 15 of the desk application, the basic purpose of the supervisor task 15 is to maintain the display of desk view 32. When an Applications Dispatcher gives control to the supervisor task 15, the supervisor task first determines if new documents and/or accessories and hence new stamps or icons need to be added to the system desk 36. If so the current bit map image 13 of the desk view 32 is updated and ne entries in the desk list 92 for the new items are made accordingly. Once an updated display of the desk view 32 is provided on display unit 18, the supervisor task 15 adds to the In Box 63 of the user's system desk 36 the stamps 34 and/or icons of the newly received files from other applications such as an annotator application, and enables the tablet task 17 (FIG. 7). Thereafter, the supervisor task 15 monitors the keyboard 12 (FIG. 1) for entry of requests for desired applications and monitors the tablet task 17 for activity. If there is no activity from either the keyboard 12 or the tablet 16 via tablet task 17 then the supervisor 15 checks for incoming mail and performs other procedures at 29 in FIG. 6. If there is incoming mail or other user desired tasks to be performed (such as satisfying an order/request for a new item from the system catalogue of desk items), the supervisor task 15 passes the necessary files and control to the Applications Dispatcher. Upon return, the supervisor task 15 begins anew and puts the new mail and/or new items in the In Box 63 (or proper active desk tray in the case of some mail) and continues to monitor the keyboard 12 and tablet task 17.

When the tablet task 17 or signals from keyboard 12 indicate that the user has selected an accessory or processor operation other than a desk tool, the supervisor task 15 disables the tablet task 17 and passes to the Applications Dispatcher an identifier of the selected processor operation and the file of any document on which the processor operation is to operate. Thereafter the Applications Dispatcher processes the requested processor operation.

The tablet task 17 (FIG. 7) follows the user's activity with the stylus 14 relative to tablet 16 while the stylus is in sensed proximity of the tablet surface and not necessarily in contact with the tablet surface. The tablet task 17 is responsible for determining which icon or stamp was selected, redrawing the necessary parts of the desk view 32, displaying an icon or stamp being moved, relocating the icon or stamp, and passing a selected non-desk tool processor operation (such as mail, printer and copier applications) to the supervisor task 15. The tablet task 17 also determines which method of use of the stylus 14 the user is currently using.

The flow chart of FIG. 7 illustrates operation of tablet task 17. When a user places an end 28, 30 of the stylus 14 within sensing range of tablet 16, the tablet task 17 displays an empty handed cursor to represent the present activity of the stylus 14. When the user positions the stylus end 28, 30 on the tablet position corresponding to a stamp 34 or icon in desk view 32, the tablet task 17 tests at 33 in FIG. 7 the pressure exerted on the active end of the stylus 14 to determine whether the user is intending to invoke a certain operation of the stylus 14 relative to the stamp 34 or icon. If the pressure exerted exceeds a predefined threshold then the tablet task 17 determines on which stamp 34 or on which type of icon (i.e. application or holding member such as a tray or folder) the stylus 14 is acting. This is accomplished by the tablet task 17 starting at the beginning of the linked list 92 (FIGS. 5a–5b) and checking each entry 94 to see if the current cursor position is within the bounds stated in the position field 96 of the entry. The first entry found to have the current cursor position within the bounds of the position field 96 is selected.

In the case of a stamp 34 being detected as the subject, the tablet task 17 then determines which method of use of the stylus 14 is being used by testing for an intersection of the boundary of the entry 94 with boundaries of all prior entries. If there are no intersections, the subject stamp 34 is determined to be fully visible (i.e. not within a stack but possibly on top of a stack) and the cursor is changed to a magnifying glass 37 indicating that the associated document will be displayed if the user lifts his/her hand within the next second. Such displaying is handled by the annotation application routine which is called by the supervisor task 15 after the supervisor task 15 receives control from the tablet task 17. If the user does not lift his/her hand within that second, then the cursor is changed to an empty hand 39.

If there are any intersections between the entry's boundary with that of any previous entries 94 in list 92, then the stamp 34 is under other stamps 34 or icons and must be made visible 41 (i.e. brought to the top of the stack in which it lies). In the case of a holding member being the detected subject, if the stylus end is determined to be positioned on a stamp inside the holding member then that stamp is made totally visible (i.e. is brought to the top of the stack in the holding member), otherwise the holding member is moved in accordance with user movement of the stylus 14. A commonly known hidden surface algorithm is used to determine which parts of the stamp and/or icon are currently visible, and hence what area of the desk view 32 must be redrawn. The desk view 32 is preferably redrawn 43 by iterative clipping but other methods are suitable. The hidden surface algorithm is then used to determine which portions of the stamps/icons of the entries below the selected entry 94 must be drawn. After this determination the selected entry 94 is removed from the linked list 92.

At this point after either the redrawing 43 of desk 32 or the changing of the cursor from a magnifying glass to an open hand 39, if the user lifts the stylus 14 from tablet 61, then the tablet task 17 is ended. In the case of having redrawn desk view 32, tablet task 17 is ended after the selected entry 94 is added to the beginning of the linked list 92. If the user, without lifting the stylus 14, moves the stylus end 28, 30 along the tablet surface, the tablet task 17 displays a grasping hand cursor and moves the image of the stamp at 47, but does not yet update the linked list 92. If the user subsequently releases the stamp on top of a processor operation icon of the activated with document type, the tablet task 17 at 49 passes to the supervisor task 15 the necessary information of the stamp and selected processor operation to have that processor operation performed. Thereafter, the application routine which performs the proper operation replaces the stamp to its original location in desk view 32, but on top of any stack at that location.

If the user releases the stamp on top of other stamps or non-processor operation icons, the new location is noted in the position field 96 of the associated entry 94 for the stamp in linked list 92. If the new position of the stamp relative to the other stamps/icons is within predefined alignment limits, then a routine for snapping the stamps/icons to each other is performed. Any new aligned stack which results changes the type field 98 of the associated entry 94. Further, the entry 94 corresponding to the newly positioned stamp/icon is made to be first in the linked list 92. It is noted that since there is no single operation to insert a stamp into a stack, the linked list 92 is not only ordered by last accessed but also by stack depth. That is, if the boundaries of the stamps/icons intersect, their order in the linked list 92 determines which is "on top of" the other.

If the detected subject is an icon of a desk accessory or processor operation then it is determined at 31 whether the use is operating the stylus in the "touch and lift" manner to select the processor operation or in the "touch and move" manner to reposition the icon of the processor operation. In the former situation, after the lifting of the stylus is detected, the tablet task 17 determines whether the subject icon represents a processor operation which is selectable without a stamp. If so, then the tablet task 17 passes the necessary information and control to the supervisor task 15. Otherwise the tablet task is ended and started anew with the detection of sufficient pressure on the stylus end.

If the stylus is being operated in the touch and move mode with respect to the subject processor operation icon, then tablet task 17 provides for the display of the icon moving in correspondence to user movement of the stylus. Thereafter if the stylus is lifted such that the subject icon is placed on a stamp then the tablet task 17 determines if the subject icon represents a processor operation which is activated with a stamp (the stamp being underneath the subject icon). If so, then the tablet task 17 passes to the supervisor task 15 control and necessary information for processing the process operation corresponding to the chosen icon and stamp. The application routine subsequently called by the supervisor task 15 replaces the icon to its original location in desk view 32.

The foregoing moving of a stamp or icon during any part of the tablet task 17 is accomplished by known methods which display the whole object in motion from an initial position through intermediate positions to a final position which are dictated by user operation of the stylus. Also such movement is exhibited in a one to one correspondence with user operation of the stylus which in turn provides a direct and natural sense of manipulation of the items on the system desk 36.

While the invention has been particularly shown and described with reference to a preferred embodiment thereof, it will be understood by those skilled in the art that various changes in form and details may be made therein without departing from the spirit and scope of the invention as defined by the appended claims. For example, though the preferred implementation utilizes a stylus for input and control; the system desk has application to systems which are solely keyboard controlled and to systems which utilize a mouse for input. Also, the system desk may cooperate with application software other than the annotator. For example, the desk may serve as a filing system for conventional word processing and spreadsheet software.

We claim:
1. Apparatus comprising:
   a. a display having a screen;
   b. an input device providing first, position inputs and a second input;
   c. a memory storing a least one reduced image of a sheet of information, said reduced image containing recognizable and distinguishable details of said sheet of information, said reduced image of each sheet of information thus being unique, said memory also storing a position for said reduced image to be displayed on said screen of said display;
   d. a processor coupled to said memory, receiving inputs from said input device, providing outputs to said display, and:
      i. displaying said reduced image on said screen at said stored position;
      ii. moving said displayed reduced image on said screen in response to said first inputs upon intersection of said first, position inputs and said position of said displayed reduced image during a predetermined first state of said second input, and stopping said movement and storing the new position of said reduced image in said memory when said second input changes to a predetermined second state, whereby sheets of information stored as reduced images in said memory may be displayed and moved about said screen to simulate manipulation of sheets of information on a desk thereby providing a desk view.

2. Apparatus as claimed in claim 1 and further including at least one icon image representative of an organizer to be used to organize one or more of said reduced images displayed on said screen, said organizer and its position on the screen stored in said memory, said processor responsive to said first, position inputs and said second input in said predetermined first state to move said icon, and upon overlapping position of one of said reduced images and said icon, through movement of said reduced image or said icon, and said second input changing from said first to said second state, to associate said reduced image with said organizer and to store an indication of said association in said memory.

3. Apparatus as claimed in claim 2, wherein one of said organizers comprises an in box for receiving reduced images representative of sheets of information coming into said apparatus.

4. Apparatus as claimed in claim 3 wherein said incoming reduced images come from within the desk view, from within the processor, or from a source external to the processor.

5. Apparatus as claimed in claim 3 wherein said organizers include user established holder members for holding user selected reduced images in user determined order, said order established by manipulating said reduced images.

6. Apparatus according to claim 1, wherein said step of moving said reduced image comprises:
   a. displaying a cursor on said screen in response to said first inputs; and
   b. upon intersection of said cursor and said position of said reduced image while said second input is in said first predetermined state, moving said reduced image and said cursor together in response to said first, position inputs.

7. Apparatus according to claim 6, wherein said input device comprises a stylus, movement of said stylus in a first plane providing said position inputs.

8. Apparatus according to claim 7, wherein said input device comprises a mouse, movement of said mouse on a planar surface providing said first inputs.

9. Apparatus according to claim 8, wherein said input device comprises a keyboard.

10. Apparatus according to claim 7, wherein the state of said second input from said stylus is a function of the distance of said stylus from a planar surface.

11. Apparatus according to claim 10 and further including a tablet, said tablet forming said planar surface and wherein the state of said second input is a function of the distance of the end of said stylus from said tablet.

12. Apparatus according to claim 11, wherein said stylus provides said second input in said predetermined second state when within a predetermined distance of said tablet and provides said second input in said predetermined first state when in contact with said tablet.

13. Apparatus as claimed in claim 1 wherein a plurality of said reduced images are stored in said memory and said processor displays two or more of said images in overlapping relation with the whole of the reduced image last moved being displayed so as to appear to be on top of the reduced images therebelow.

14. Apparatus as claimed in claim 13 wherein, upon two of said reduced images having stored positions within a predetermined first distance, the position of the top reduced image is set to be a predetermined second distance from the position of the reduced image thereunder and a value is stored in memory associated with each of said reduced images indicating that they are bound to each other.

15. Apparatus as claimed in claim 14 wherein associated with each reduced image there is stored in said memory an enlarged image thereof, said processor being responsive to a change of said second input from said predetermined first state to said predetermined second state while said first, position inputs correspond to a position on a displayed reduced image to display the enlarged image corresponding to said reduced image.

16. Apparatus according to claim 15, wherein said first predetermined distance is user settable.

17. Apparatus as claimed in claim 15 wherein said enlarged image occupies substantially the entire display screen.

18. Apparatus as claimed in claim 1 and further including at least one icon image representative of an application to be performed on one or more of said reduced images displayed on said screen, each icon image and its position on the screen being stored in said memory, said processor responsive to said first, position inputs and said second input in said predetermined first state to move said icon, and upon overlapping the positions of one of said reduced images and said icon, through movement of said image or said icon and said second input changing from said predetermined first state to said predetermined second state, carrying out the associated application.

19. Apparatus as claimed in claim 18, wherein when a reduced image is positioned over an icon, said processor repositions said icon and image such as to display said icon over said image.

20. Apparatus as claimed in claim 19, wherein said memory further contains a linked list containing an address and position for reach reduced image and each icon image being displayed on the screen, the order in said list establishing which image was last moved and thus which image is to be displayed on top of another image and wherein said repositioning includes moving the entry in said linked list for said icon image to the top of said list over the entry for said reduced image.

21. A data processing system as claimed in claim 18 wherein a plurality of reduced images are stored in said memory and said processor displays two or more of said reduced images in overlapping relation with the whole of the reduced image last moved being displayed so as to appear to be on top of the reduced images therebelow with two of said reduced images having stored positions a predetermined distance from the position of the reduced image thereunder and a value is stored in memory associated with each of said reduced images indicating that they are bound to each other.

22. Apparatus as claimed in claim 21 and further including said processor moving all reduced images which are bound together as a group when said first, position input overlies a portion of an underlying image only and moving only said top image when said first, position input overlies said top image.

23. Apparatus as claimed in claim 21, wherein one of said applications comprises a stapler, said processor responsive to said stapler being positioned on said bound group of reduced images and said second input changing from said predetermined first state to said predetermined second state to thereafter always act on said stack of reduced images as a group until unstapled, thereby simulating stapled documents.

24. Apparatus as claimed in claim 23, wherein one of said applications comprises a stapler, said processor responsive to said unstapler being placed on a stapled stack of reduced images and a change of said second input from said first to said second state to unstaple said reduced images and to return them to a state of being bound together in a stack, but individually removable from said stack.

25. Apparatus as claimed in claim 18, wherein said application comprises an application having user settable attributes and said processor, in response to said icon being placed on said reduced image, displaying a representation of a control panel enabling user specification of the user settable attributes of the operation, said processor responsive to said first and second inputs of said input device to receive said user specification of attributes.

26. Apparatus as claimed in claim 25, wherein said operation comprises a printer operation.

27. Apparatus as claimed in claim 25, wherein said operation comprises a copying operation.

28. In a data processing system including a processor, a memory, an input device, and a video display, a method of providing a screen desk view including the display of icon type items and stamp type items, said icon type items including at least an organizer icon and said stamp type items comprising at least one reduced image of a sheet of information, said reduced image containing recognizable and distinguishable details of said sheet of information, the reduced image of each sheet of information thus being unique, comprising:
 a. providing in said memory stamp images for each stamp type item to be displayed;
 b. providing in said memory at least an image of one organizer;
 c. providing in said memory a data base for all items currently displayed on the screen desk view, the data base having an entry for each item, said entry describing said item and including:
  i. the location of said item on the screen;
  ii. the type of item;
  iii. the memory location of an image file for the item;
 d. providing, for each organizer displayed, an organizer data file in said memory containing an entry for each stamp type item contained in said organizer, said entries contained in said organizer data file in the same order that said stamp type items are in said organizer, one on top of the other;
 e. displaying said desk view including at least one organizer;
 f. displaying a plurality of stamp type items in said organizer with the stamp at the top of said organizer visible;
 h. manipulating and rearranging said stamp type items in said organizer on said screen; and
 i. reordering said organizer data file as said stamp type items are rearranged.

29. The method according to claim 28, wherein said system includes a pointing device and further including:
 a. generating a cursor;
 b. moving said cursor with said pointing device, said pointing device also being capable of providing an input to said system; and
 c. carrying out said step of manipulating said stamp type items through the use of said pointing device and cursor.

30. The method according to claim 28 and further including a superfile associated with each of said stamp type items containing therein at least a full sized image of the sheet of information contained in the reduced image of said stamp type item, the location of said superfile also being contained in said data entry in said data base and further including the step of providing, in response to the selection of a stamp type item and the provision of an input while the cursor is located on said stamp type item, the display of a full screen image of the sheet of information contained in said stamp type item.

31. The method according to claim 30, wherein said pointing device comprises a stylus and surface representative of said screen view and wherein the provision of each of said inputs comprises lifting said stylus from said surface.

32. The method according to claim 28, wherein said data base comprises a doubly-linked list.

33. Apparatus comprising:
 a. a display having a screen;

b. an input device providing first, position inputs and a second input;
c. a memory storing
  i. a least one reduced image of a sheet of information, said reduced image containing recognizable and distinguishable details of said sheet of information, the reduced image of each sheet of information thus being unique, said memory also storing a position for said reduced image to be displayed on the screen of said display;
  ii. at least one icon image representative of an application to be performed on one or more of said reduced images and its position on the screen;
  iii. at least one icon image representative of an organizer to be used to organize one or more of said reduced images and its position on the screen;
d.
d. a processor coupled to said memory, receiving inputs from said input device, providing outputs to said display and:
  i. displaying said stored reduced image organizer icon and application icon on said screen at their respective stored positions;
  ii. moving a respective one of said reduced images and said icons on said screen in response to said first inputs upon intersection of said first, position inputs and the position of said displayed reduced image or one of said icon images during and a predetermined first state of said second input, and stopping said movement and storing the new position of said reduced image or icon image in said memory when said second input changes to a predetermined second state;
  iii. upon overlapping the positions of one of said reduced images and said application icon, through movement of said reduced image or said application icon and said second input changing from said first to said second state, carrying out the associated application; and
  iv. upon overlapping the positions of one of said reduced images and said organizer icon, through movement of said reduced image or said organizer icon, and said second input changing from said first to said second state, to associate said reduced image with said organizer and to store an indication of said association in said memory; whereby sheets of information stored as reduced images in said memory and said icon images may be displayed and moved about said screen to simulate manipulation of sheets of information, organizers, and applications on a desk, thereby providing a desk view.

* * * * *

UNITED STATES PATENT AND TRADEMARK OFFICE
CERTIFICATE OF CORRECTION

PATENT NO. : 5,060,135

DATED : October 22, 1991

INVENTOR(S) : Stephen R. Levine, et al.

It is certified that error appears in the above-identified patent and that said Letters Patent is hereby corrected as shown below:

In column 10, line 18 change "ualitative" to --qualitative--;

In column 11, line 14 change "cursor 69" to --cursor 64--;

In column 19, line 54, column 20, lines 49 and 54, and column 21, line 3 change "91" to --87--;

In column 25, lines 63 and 65, change "60" to --96--;

In column 26, line 37, change "ne" to --new--;

In column 28, lines 5-6 change "tablet 61" to --tablet 16--;

In claim 33, column 33 remove line 18 in its entirety.

Signed and Sealed this

Seventh Day of September, 1993

*Attest:*

BRUCE LEHMAN

*Attesting Officer*     *Commissioner of Patents and Trademarks*